United States Patent
Takahashi

(10) Patent No.: US 11,224,809 B2
(45) Date of Patent: Jan. 18, 2022

(54) COMPUTER SYSTEM, GAME SYSTEM, AND PROGRAM

(71) Applicant: BANDAI NAMCO Entertainment Inc., Tokyo (JP)

(72) Inventor: Toru Takahashi, Tokyo (JP)

(73) Assignee: BANDAI NAMCO ENTERTAINMENT INC., Tokyo (JP)

( * ) Notice: Subject to any disclaimer, the term of this patent is extended or adjusted under 35 U.S.C. 154(b) by 0 days.

(21) Appl. No.: 16/893,019

(22) Filed: Jun. 4, 2020

(65) Prior Publication Data

US 2020/0398160 A1 Dec. 24, 2020

(30) Foreign Application Priority Data

Jun. 20, 2019 (JP) .............................. JP2019-114695

(51) Int. Cl.
*A63F 13/537* (2014.01)
*A63F 13/48* (2014.01)

(52) U.S. Cl.
CPC ............ *A63F 13/537* (2014.09); *A63F 13/48* (2014.09)

(58) Field of Classification Search
CPC ........ A63F 13/335; A63F 13/10; A63F 13/48; A63F 13/537; A63F 13/795
See application file for complete search history.

(56) References Cited

U.S. PATENT DOCUMENTS

| | | | | |
|---|---|---|---|---|
| 5,411,270 A | * | 5/1995 | Naka | A63F 13/10 463/33 |
| 5,470,080 A | * | 11/1995 | Naka | A63F 13/10 463/33 |
| 7,766,746 B2 | * | 8/2010 | Fujii | A63F 13/52 463/31 |
| 8,944,911 B2 | * | 2/2015 | Avent | A63F 13/537 463/31 |
| 2003/0190940 A1 | * | 10/2003 | Gordon | A63F 13/005 463/9 |
| 2004/0255032 A1 | * | 12/2004 | Danieli | H04L 67/38 709/229 |
| 2008/0318687 A1 | * | 12/2008 | Backer | A63F 13/12 463/42 |
| 2009/0149248 A1 | * | 6/2009 | Busey | A63F 13/12 463/29 |
| 2009/0191971 A1 | * | 7/2009 | Avent | A63F 13/00 463/41 |

(Continued)

FOREIGN PATENT DOCUMENTS

JP 2006-102275 A 4/2006

*Primary Examiner* — Steve Rowland
(74) *Attorney, Agent, or Firm* — Oliff PLC

(57) ABSTRACT

A server system includes a game start control section configured to perform a game start control including setting a game space for each player as an initial state and allowing the player to start gameplay in the game space, an opponent space status display control section configured to perform a control for displaying status of at least one game space other than the game space being used by the player himself/herself for performing the gameplay on a computer device of each player, and a transfer control section configured to transfer an executing player satisfying a given transfer execution condition from the game space being used by the executing player for performing the gameplay to another game space.

24 Claims, 14 Drawing Sheets

(56) References Cited

U.S. PATENT DOCUMENTS

| | | | |
|---|---|---|---|
| 2010/0056236 A1* | 3/2010 | Rhyne, IV | A63F 13/00 |
| | | | 463/1 |
| 2010/0227669 A1* | 9/2010 | Van Luchene | G07F 17/32 |
| | | | 463/23 |
| 2010/0255894 A1* | 10/2010 | Kidakarn | A63F 13/10 |
| | | | 463/2 |
| 2011/0118033 A1* | 5/2011 | Fiedler | A63F 13/85 |
| | | | 463/42 |
| 2011/0190062 A1* | 8/2011 | Lee | A63F 9/24 |
| | | | 463/42 |

* cited by examiner

COMPUTER SYSTEM, GAME SYSTEM, AND PROGRAM

This application is based upon and claims the benefit of priority to Japanese Patent Application No. 2019-114695 filed on Jun. 20, 2019, the entire contents of which are incorporated herein by reference.

BACKGROUND

Japanese Unexamined Patent Application Publication No. 2006-102275 discloses a technique related to a game that progresses with a game space set for each player. When a player selects an attack target, a game parameter of the attack target is modified to disadvantage a game of the attack target.

However, the game disclosed in Japanese Unexamined Patent Application Publication No. 2006-102275 only allows an attack on the attack target by an indirect means of modifying the game parameter, and thus has limitations in amusement in competing.

DESCRIPTION OF EXEMPLARY EMBODIMENTS

Figure 1:
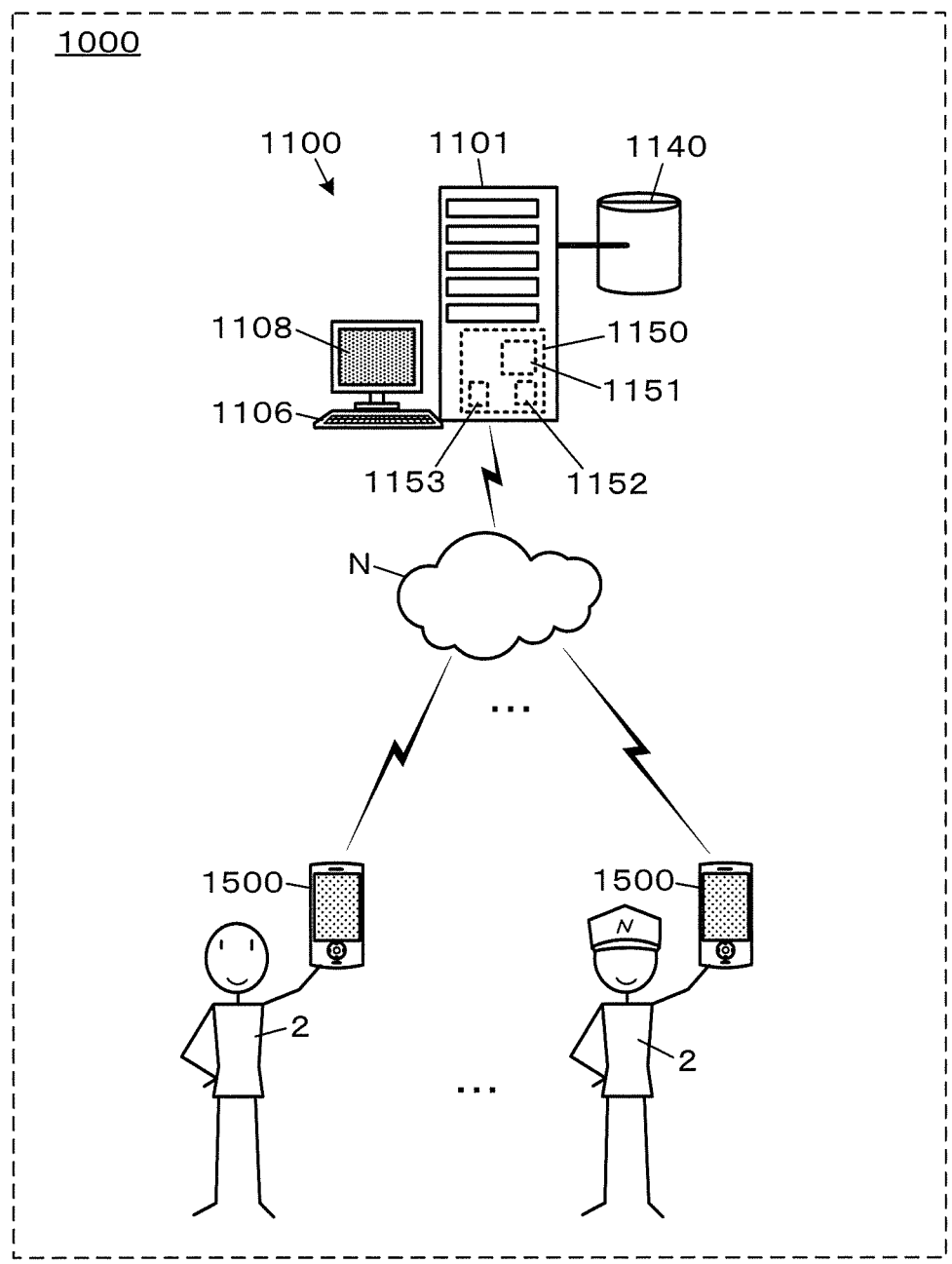
FIG. 1 is a diagram illustrating an example of a whole configuration of a game system.

The following disclosure provides many different embodiments, or examples, for implementing different features of the provided subject matter. These are, of course, merely examples and are not intended to be limiting. In addition, the disclosure may repeat reference numerals and/or letters in the various examples. This repetition is for the purpose of simplicity and clarity and does not in itself dictate a relationship between the various embodiments and/or configurations discussed. Further, when a first element is described as being "connected" or "coupled" to a second element, such description includes embodiments in which the first and second elements are directly connected or coupled to each other, and also includes embodiments in which the first and second elements are indirectly connected or coupled to each other with one or more other intervening elements in between.

In accordance with one of some embodiments, there is provided a computer system comprising:

at least one processor or circuit programmed to:

perform a game start control comprising setting a game space for each player as an initial state and allowing the player to start gameplay where the player operates a player character in the game space;

perform a control for displaying information about status of at least one game space other than the game space being used by the player himself/herself for performing the gameplay on a computer device of each player; and perform a transfer control for transferring a player character of an executing player from a game space being used by the executing player for performing the gameplay to another game space, the executing player satisfying a given transfer execution condition.

As a result, in some embodiments, the game space can be set for each player as the initial state, and the player can start the gameplay where the player operates his/her player character. Also, the player character of the executing player satisfying the transfer execution condition can be transferred to the other game space. The player who has started the gameplay in his/her own game space can play the game in the other game space to which his/her player character transfers during the game. This can add new amusement to a competition system of the game for multiple players.

In accordance with one of some embodiments, there may be provided the computer system, wherein the at least one processor or circuit is further programmed to perform a progress control of the game space by the transfer control in a state without the player character that is made absent.

As a result, in some embodiments, the progress control of the game space used by the executing player for playing the game can be performed without the player character after the player character of the executing player transfers to the other game space.

In accordance with one of some embodiments, there may be provided the computer system, wherein the other game space is a game space being used by a player other than the executing player for performing the gameplay.

As a result, in some embodiments, the executing player can play the game in the game space being used by another player for performing the gameplay when the executing player satisfies the transfer execution condition.

In accordance with one of some embodiments, there may be provided the computer system, wherein performing the transfer control comprises performing a control for returning the player character of the executing player to an original game space used before transfer, when a given transfer termination condition is satisfied.

As a result, in some embodiments, the executing player can operate the player character to play the game in the game space of a transfer destination until the transfer termination condition is satisfied, and then operate the player character returned to the original game space to play the game.

In accordance with one of some embodiments, there may be provided the computer system, wherein performing the transfer control comprises determining the other game space based on an operation by the executing player for selecting the other game space or for selecting another player performing the gameplay in the other game space.

As a result, in some embodiments, the game space of the transfer destination to which the player character of the executing player is to be transferred can be determined in accordance with the operation by the executing player.

In accordance with one of some embodiments, there is provided the computer system, when the other game space is determined based on the operation by the executing player for selecting the other player performing the gameplay in the other game space, performing the transfer control comprises performing a control for accepting an operation for selecting the other player only with other players satisfying a given selectability condition as selectable options.

As a result, in some embodiments, the game space of the transfer destination to which the player character of the executing player is to be transferred can be determined from the game spaces of the other players satisfying the selectability condition.

In accordance with one of some embodiments, there may be provided the computer system, wherein the at least one processor or circuit is further programmed to perform a control for suppressing the transfer control when another player performing the gameplay exists in the other game space and the other player satisfies a given transfer block condition based on an operation input from the other player.

As a result, in some embodiments, the game space of another player not satisfying the transfer block condition can be selected as the game space of the transfer destination to implement the transfer control.

In accordance with one of some embodiments, there may be provided the computer system, wherein the at least one processor or circuit is further programmed to notify the computer device of another player that the transfer control is to be performed, when the other player performing the gameplay exists in the other game space.

As a result, in some embodiments, a notification can be provided to the player performing the gameplay in the game space of the transfer destination to notify that the player character of the executing player is to be transferred.

In accordance with one of some embodiments, there is provided a computer system comprising:

at least one processor or circuit programmed to:

perform a game start control comprising setting a game space for each player as an initial state and allowing the player to start gameplay where the player operates a player character in the game space;

perform a control for displaying information about status of at least one game space other than the game space being used by the player himself/herself for performing the gameplay on a computer device of each player; and perform a transfer control for transferring a player character of another player performing the gameplay in another game space to a game space being used by an executing player for performing the gameplay, the executing player satisfying a given transfer execution condition.

As a result, in some embodiments, the game space can be set for each player as the initial state, and the player can start the gameplay where the player operates his/her player character. Also, the player character of the other player playing the game in the other game space can be transferred to the game space of the executing player satisfying the transfer execution condition. The player who has started the gameplay in his/her own game space can play the game in the other game space to which his/her player character transfers during the game. This can add new amusement to the competition system of the game for multiple players.

In accordance with one of some embodiments, there may be provided the computer system, wherein the at least one processor or circuit is further programmed to perform a control for selecting the other player from players satisfying a given selectability condition out of players other than the executing player.

As a result, in some embodiments, the other player whose player character is to be transferred can be selected from the players satisfying the selectability condition.

In accordance with one of some embodiments, there may be provided the computer system, wherein the at least one processor or circuit is further programmed to suppress the transfer control when the other player performing the gameplay in the other game space satisfies a given transfer block condition based on an operation input from the other player.

As a result, in some embodiments, another player not satisfying the transfer block condition can be selected, and the player character of this player can be transferred to implemented the control.

In accordance with one of some embodiments, there may be provided the computer system, wherein the at least one processor or circuit is further programmed to notify the computer device of the other player performing the gameplay in the other game space that the transfer control is to be performed.

As a result, in some embodiments, a notification can be provided to the other player performing the gameplay in the other game space to notify that his/her player character is to be transferred to the game space of the executing player.

In accordance with one of some embodiments, there is provided a computer system comprising:

at least one processor or circuit programmed to:

perform a game start control comprising setting a game space for each player as an initial state and allowing the player to start gameplay where the player operates a player character in the game space;

perform a control for displaying information about status of at least one game space other than the game space being used by the player himself/herself for performing the gameplay on a computer device of each player; and make a connection between a game space being used by an executing player for performing the gameplay and another game space to allow a player character of the executing player to be movable to the other game space, the executing player satisfying a given transfer execution condition.

Furthermore, in accordance with one of some embodiments, there may be provided the computer system, wherein allowing the player character to be movable comprises making the connection between a given position of the game space being used by the executing player for performing the gameplay and a given position of the other game space in a passable manner to allow the player character of the executing player to be movable to the other game space.

As a result, in some embodiments, the game space can be set for each player as the initial state, and the player can start the gameplay where the player operates his/her player character. Also, the game space being used for performing the gameplay by the executing player satisfying the transfer execution condition can be connected with the other game space to allow the player character of the executing player to be movable. The player who has started the gameplay in his/her own game space can play the game in the other game space by moving his/her player character to the other game space during the game. This can add new amusement to the competition system of the game for multiple players.

In accordance with one of some embodiments, there may be provided the computer system, wherein allowing the player character to be movable comprises performing a control for releasing the connection when a given termination condition is satisfied.

As a result, in some embodiments, the connection between the game space of the executing player and the other game space can be released, when the transfer termination condition is satisfied.

In accordance with one of some embodiments, there may be provided the computer system, wherein the at least one processor or circuit is further programmed to generate a disturbance object for disturbing the gameplay of a disturbance target player in a game space being used by the disturbance target player for performing the gameplay, the disturbance target player being a player other than a source player satisfying a given disturbance element generation condition.

As a result, in some embodiments, the player can generate the disturbance object in another game space to disturb the gameplay of another player in the other game space on condition that the player satisfy the disturbance element generation condition.

In accordance with one of some embodiments, there may be provided the computer system, wherein generating the disturbance object comprises variably controlling a number of disturbance target players and/or a number of disturbance objects to be generated.

As a result, in some embodiments, the number of disturbance targets and the number of disturbance objects to be generated can be changed.

In accordance with one of some embodiments, there may be provided the computer system, wherein the at least one processor or circuit is further programmed to reflect a given additional score based on a disturbance result by the disturbance object to a game score of the source player.

As a result, in some embodiments, the disturbance result, such as whether the disturbance to the disturbance target by the disturbance object has been successful, can be reflected to the game score.

In accordance with one of some embodiments, the game system may comprises:

computer devices of a plurality of players; and a server system that is the computer system, the computer devices and the server system being configured to communicate with each other.

In accordance with one of some embodiments, there is provided a computer device comprising:

at least one processor or circuit programmed to:

perform a game start control comprising setting a game space for a self player operating the computer device as an initial state and allowing the self player to start gameplay where the self player operates a player character in the game space;

perform a control for displaying information about status of at least one game space being used by an opponent player operating another computer device for performing the gameplay; and perform a transfer control for transferring the player character of the self player from the game space being used by the self player for performing the gameplay to another game space, when the self player satisfies a given transfer execution condition.

In accordance with one of some embodiments, there is provided a computer device comprising:

at least one processor or circuit programmed to:

perform a game start control comprising setting a game space for a self player operating the computer device as an initial state and allowing the self player to start gameplay where the self player operates a player character in the game space;

perform a control for displaying information about status of at least one game space being used by an opponent player operating another computer device for performing the gameplay by operating a player character; and perform a transfer control for transferring the player character of the opponent player to the game space being used by the self player for performing the gameplay, when the self player satisfies a given transfer execution condition.

In accordance with one of some embodiments, there is provided a computer device comprising:

at least one processor or circuit programmed to:

perform a game start control comprising setting a game space for a self player operating the computer device as an initial state and allowing the self player to start gameplay where the self player operates a player character in the game space;

perform a control for displaying information about status of at least one game space being used by an opponent player operating another computer device for performing the gameplay by operating a player character; and make a connection between the game space being used by the self player for performing the gameplay and another game space to allow the player character of the self player to be movable to the other game space, when the self player satisfies a given transfer execution condition.

Exemplary embodiments are described below. Note that the following exemplary embodiments do not in any way limit the scope of the content defined by the claims laid out herein. Note also that all of the elements described in the present embodiment should not necessarily be taken as essential elements A preferred embodiment of the present disclosure is hereinafter described referring to the drawings. However, the present disclosure is not limited by the following embodiment, and the modes to which the present disclosure is applicable are not limited to the following embodiment. In addition, common referential numerals are given to identical components in the drawings.

[Whole Configuration]

FIG. 1 is a diagram illustrating an example of a whole configuration of a game system 1000 in accordance with the present embodiment. As illustrated in FIG. 1, the game system 1000 includes a server system 1100 as a computer system and a player terminal 1500 possessed by a player (a user) 2 playing a game in accordance with the present embodiment. The server system 1100 and the player terminal 1500 are connected to perform data communication with each other via a network N.

The network N is a communication channel that enables data communications. Specifically, the network N includes a communication network such as a local area network (LAN) using a private line (a private cable) for direct connection, Ethernet (registered trademark), or the like, a telecommunication network, a cable network, and an Internet. A communication method may be a cable communication method or a wireless communication method.

The server system 1100 includes a main body device 1101, a keyboard 1106, a touch panel 1108, and a storage 1140. The main body device 1101 includes a control board 1150 including a microprocessor of various types such as a central processing unit (CPU) 1151, a graphics processing unit (GPU), or a digital signal processor (DSP), an integrated circuit (IC) memory 1152 of various types such as a video random-access memory (VRAM), a random-access memory (RAM), or a read-only memory (ROM), and an electronic component such as a communication device 1153. The control board 1150 may be entirely or partially implemented by an application specific integrated circuit (ASIC), a field-programmable gate array (FPGA), or a system on a chip (SoC). Through a calculation process performed by the CPU 1151 or the like based on a predetermined program and data, the server system 1100 implements a user management function related to user registration or the like and a game management function of providing data required to play the game with the player terminal 1500 to manage an execution control on the game played with the player terminal 1500. That is, the game in accordance with the present embodiment is implemented as a kind of client-server online game. A player 2 uses his/her own player terminal 1500 to access the server system 1100 and log in with an issued account to play the game in accordance with the present embodiment.

The server system 1100 is not limited to a single server configuration illustrated in FIG. 1, and may be configured such that a plurality of blade servers are connected via an internal bus to perform data communication to share the functions. Alternatively, the server system 1100 may be configured such that a plurality of independent server devices installed at remote places perform data communication via the network N to serve as the server system 1100 as a whole.

The player terminal 1500 is a computer system that functions as a man-machine interface, and connects to the network N via a mobile phone base station, a wireless communication base station, or the like to perform data communication with the server system 1100. The player terminal 1500 may be implemented as, for example, a smartphone, a mobile phone, a portable game device, a stationary consumer game device, a controller of the stationary consumer game device, an arcade game apparatus, a personal computer, a tablet computer, or a wearable computer.

Figure 2:
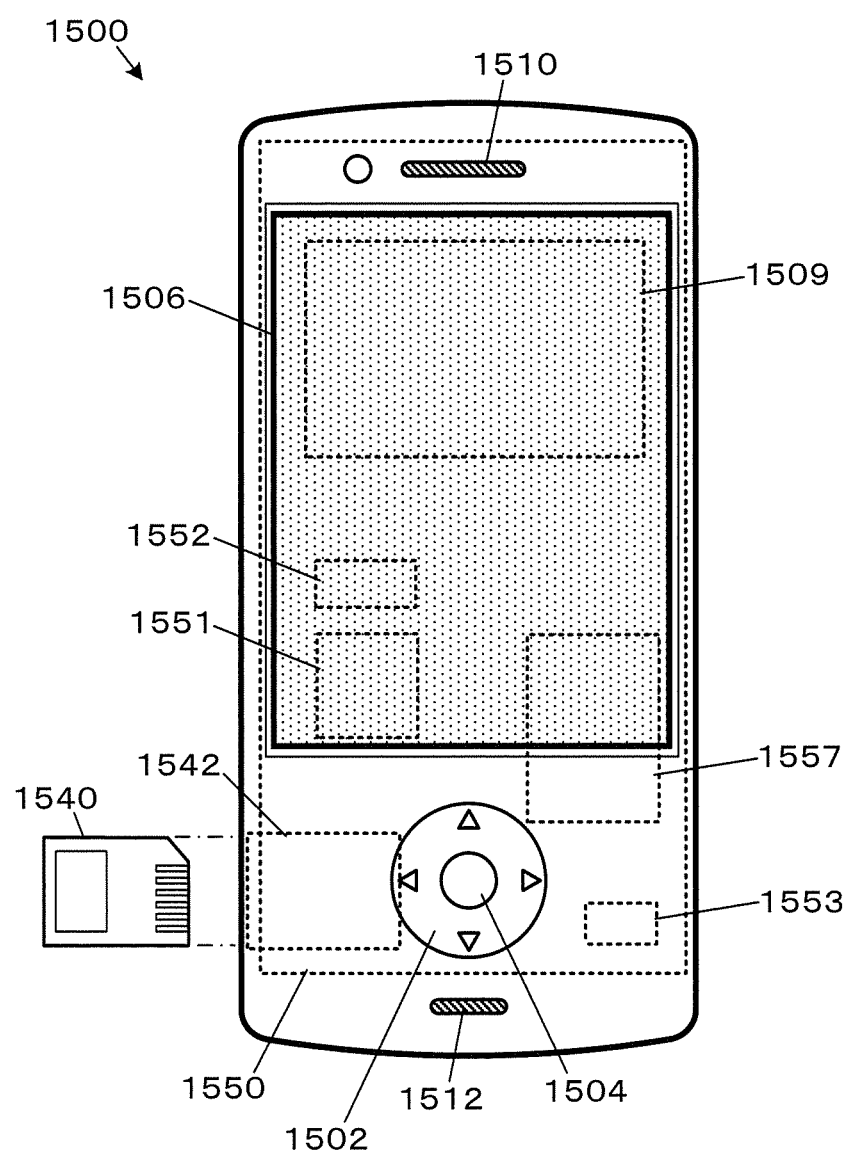
FIG. 2 is a diagram illustrating an example of a device configuration of a player terminal.

FIG. 2 is a diagram illustrating an example of a device configuration of a smartphone serving as the player terminal 1500. As illustrated in FIG. 2, the player terminal 1500 includes an arrow key 1502, a home key 1504, a touch panel 1506 that functions as an image display device and a touch position input device, a built-in battery 1509, a speaker 1510, a microphone 1512, a control board 1550, and a memory card reader 1542 that can write and read data on and from a memory card 1540 that is a computer readable storage medium. The player terminal 1500 further includes a power button, a volume control button, or the like (not illustrated).

The control board 1550 includes, for example, a microprocessor of various types (e.g., a CPU 1551, a GPU, or a DSP), an IC memory 1552 of various types (e.g., a VRAM, a RAM, or a ROM), and a wireless communication module 1553 for performing wireless communication with a mobile phone base station, a wireless LAN base station, or the like connected to the network N. The control board 1550 includes so-called I/F circuits (interface circuits) 1557 including a circuit that receives signals from the arrow key 1502 and the home key 1504, a driver circuit for the touch panel 1506, an output amplifier circuit that outputs a sound signal to the speaker 1510, an audio signal generation circuit that generates a signal corresponding to the sound collected by the microphone 1512, a signal input-output circuit that inputs and outputs a signal to and from the memory card reader 1542. These elements included in the control board 1550 are electrically connected through a bus circuit or the like so that the elements can read and write data and exchange signals. The control board 1550 may be partially or entirely implemented by the ASIC, the FPGA, or the SoC.

The IC memory 1552 in the control board 1550 stores, for example, a game client program and various types of setting data required to execute the game client program. The game client program or the like is downloaded from the server system 1100 at an appropriate timing. Alternatively, the game client program or the like may be read out from a storage medium such as the memory card 1540 separately provided. The CPU 1551 or the like executes the game client program to perform a calculation process, and controls each section of the player terminal 1500 to enable gameplay of the player 2 in accordance with an operation input with the touch panel 1506, the arrow key 1502, and the home key 1504.

[Game Screen]

The game in accordance with the present embodiment is a competition game in which a plurality of players operate their own player characters to play the game. A winner of the game is a last remaining player whose game is not over. The number of players participating in the game, or the number of player characters operated by the players is not particularly limited.

Figure 3:
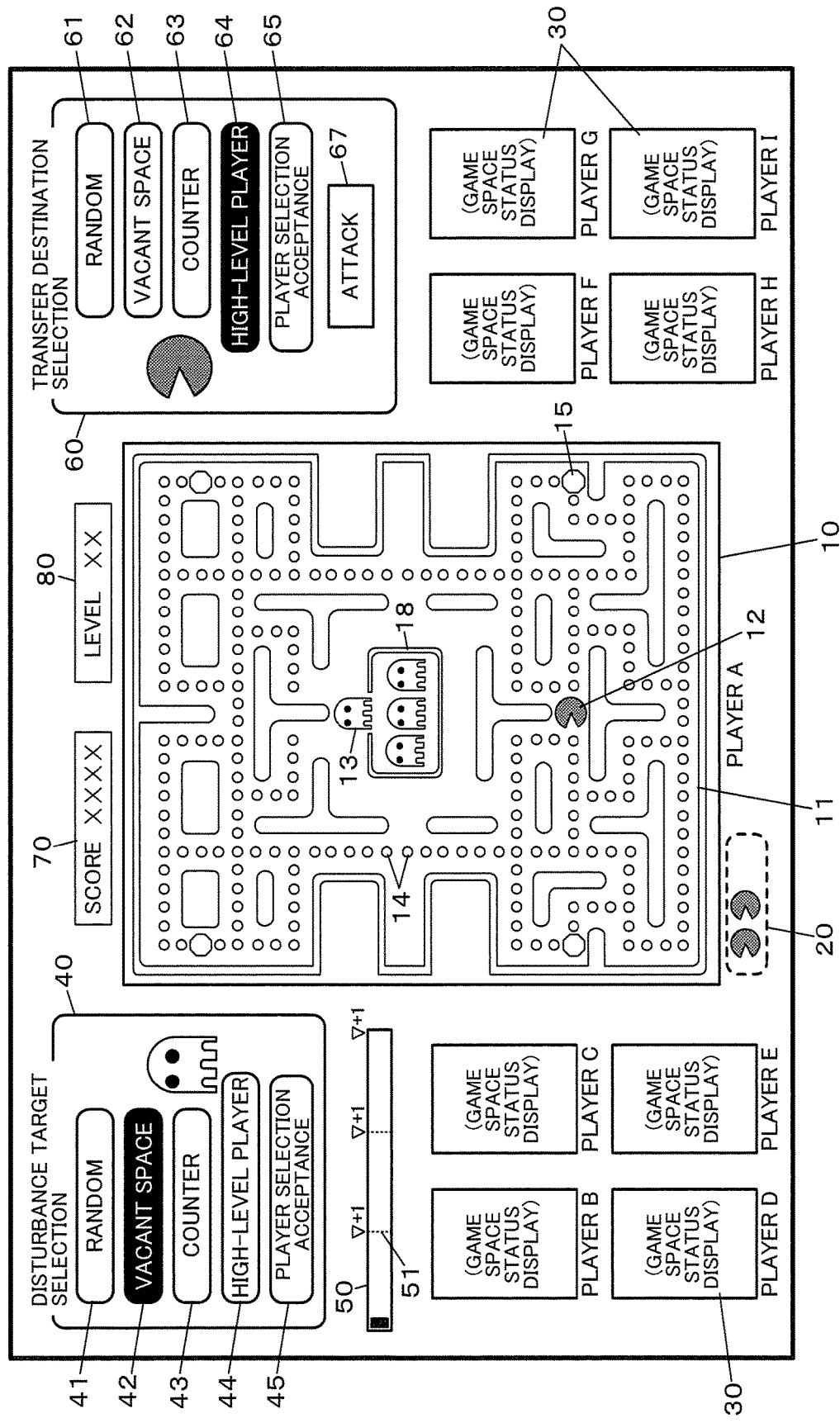
FIG. 3 is a diagram illustrating an example of a game screen.

FIG. 3 is a diagram illustrating an example of a game screen of the game in accordance with the present embodiment. As illustrated in FIG. 3, the game screen includes a game image display section 10, a remaining life display section 20, an opponent space status display section 30, a disturbance target selection section 40, a cookie gauge 50, a transfer destination selection section 60, a score display section 70, and a level display section 80.

The game image display section 10 displays an image of a game space (a game image). In the game in accordance with the present embodiment, the game space is set for each player, and the player plays the game basically in his/her own game space (hereinafter also referred to as an "original space" as appropriate). Accordingly, the game image display section 10 displays the game image of the original space. However, in a transfer attack described later, the player plays the game in a game space (hereinafter also referred to as a "transfer destination space" as appropriate) of a player at a transfer destination (hereinafter also referred to as a "transfer destination player" as appropriate) as a play space. In such a case, the game image display section 10 displays an image of the transfer destination space.

The remaining life display section 20 displays the number of remaining lives of a player character (two in the example in FIG. 3). A predetermined number of lives (e.g., three lives) of the player character are provided to the player at a beginning of the game, for example. In addition, an additional life is provided during the game when a predetermined condition, such as that a game score reaches a predetermined value, is satisfied. When a player character operated with no more remaining life is defeated, the game of the player is over.

The opponent space status display section 30 is prepared for each opponent player, is disposed around the game image display section 10, and displays information about status of the game space of each opponent player. FIG. 3 illustrates eight opponent space status display sections 30, and thus shows the example where nine players including a self player himself/herself are competing. Although illustrations are omitted in FIG. 3, each of the opponent space status display sections 30 displays, for example, a compact view of a content of the game image display section on the player terminal 1500 of each opponent player to display the information about the status of the game space of each opponent player.

FIG. 3 illustrates the example of the competition by nine players; however, the number of players able to participate in the game is not limited. Accordingly, when all opponent space status display sections 30 of all opponent players cannot be disposed in the game screen due to a size problem or the like, some of the opponent players may be selected and the opponent space status display sections 30 of the selected opponent players may be displayed. For example, the opponent space status display sections 30 to be displayed may include those of a predetermined number of opponent players ranked higher in the game score, or those of opponent players registered as friends.

The information about the game space is not limited to the compact view of the game image display section, and a text or an icon describing the status of the game space may be displayed in a frame. Specifically, this can include a description of, for example, a current game score or level of the opponent player, the number of remaining lives of the player character, whether the game of the opponent player is over, a gauge value of the cookie gauge, the number of enemy characters, status of a disturbance attack or a transfer attack, or whether the game space of the opponent player is in a "vacant space" state (in a vacant house state without the player character) described later.

The disturbance target selection section 40 includes five buttons 41 to 45, "random", "vacant space", "counter", "high-level player", or "player selection acceptance", one of which can be selected, and accepts a disturbance target selection operation of selecting one of the buttons. In FIG. 3, the vacant space button 42 is in a selected state. As described later in detail, a game space (hereinafter also referred to as a "disturbance target space" as appropriate) of a player of a disturbance target (disturbance target player) is determined in accordance with a selected button 41 to 45 in the disturbance target selection section 40 (a disturbance target determination process).

The cookie gauge 50 is a gauge, a value of which rises in accordance with the number of collected cookies 14 described later. In accordance with the present embodiment, in the disturbance attack described later, the number of enemies to appear is determined in accordance with the gauge value of the cookie gauge 50 (an appearing enemy number determination process). For example, in the appearing enemy number determination process, the number of enemies to appear is basically "one", and the number increases by "three" at most in accordance with the gauge value. When the gauge value is at a threshold value 51 or higher, defined in phases, at the time of the disturbance attack, the number of enemies to appear increases by an additional number in accordance with the threshold value 51.

Similar to the disturbance target selection section 40, the transfer destination selection section 60 includes five buttons 61 to 65, "random", "vacant space", "counter", "high-level player", or "player selection acceptance", one of which can be selected, and accepts a transfer destination selection operation of selecting one of the buttons. In FIG. 3, the high-level player button 64 is in a selected state. As described later in detail, a transfer destination space is determined in accordance with a selected button 61 to 65 in the transfer destination selection section 60 (a transfer destination determination process). In addition, the transfer destination selection section 60 includes an attack button 67 for instructing a timing of the transfer attack, and accepts an execution operation of the transfer attack with the attack button 67.

The score display section 70 displays the current game score of the self player himself/herself. The game score is added when the player collects an item including a cookie 14, a power cookie 15, or fruit 16 (see FIG. 4), or when the player defeats an enemy character 13. Moreover, the game score is added based on results of the disturbance attack and the transfer attack. For example, in accordance with the present embodiment, an additional score is predetermined for each item including the cookie 14, the power cookie 15, and the fruit 16, and for the case where the player defeats the enemy character 13. In addition, the additional score to be predetermined also includes a disturbance score provided when the player succeeds in the disturbance attack and a winning score provided when the player defeats a player character of an opponent player in a direct confrontation mode caused in the transfer attack.

The level display section 80 displays the current level of the self player himself/herself. In accordance with the present embodiment, the level is updated as needed as a total value (a total number) of the number of successful disturbance attacks and the number of successful transfer attacks, for example. Alternatively, the level may be a value obtained by calculating only the number of successful disturbance attacks, or only the number of successful transfer attacks.

Each player participating in the game plays the game watching the display of the game image display section 10 in the game screen displayed on his/her player terminal 1500, while grasping the status of the game spaces of the opponent players through the display of the opponent space status display sections 30 to perform an operation to the disturbance target selection section 40 or the transfer destination selection section 60.

[Game Description]

Next, detailed descriptions of the game in accordance with the present embodiment is provided below referring to a content displayed in the game image display section 10 in FIG. 3. First, the game space includes a player character 12 operated by the player, enemy characters 13, and various items such as cookies 14, power cookies 15, and fruit 16, disposed in a maze-like stage 11 serving as a setting. FIG. 3 illustrates an initial arrangement of the character and the like at the beginning of the game. In accordance with the present embodiment, a configuration of the maze and the initial arrangement of the character and the like are identical in the game spaces of all players, and the players simultaneously start the game from a state illustrated in FIG. 3.

The enemy characters 13 are computer-controlled to move in the maze from a den 18 as a start point and to pursue the player character 12. The number of enemy characters 13 is not particularly limited. An initial state includes four enemy characters, for example. Furthermore, in accordance with the present embodiment, all the four enemy characters 13 are of the same type. However, an enemy character that has different appearance or different moving characteristics (e.g., moving speed or a pursuing movement pattern) may be included. Meanwhile, the cookies 14 and the power cookies 15 are disposed along the maze. The player moves the player character 12 in the maze avoiding contact with the enemy characters 13, and brings the player character 12 into contact with the cookies 14 and the power cookies 15 to collect them. When the player character 12 accidentally makes contact with the enemy character 13, the player character 12 is defeated by the enemy character 13 and disappears. The player character 12 may be operated by the arrow key 1502 or by touch operation on the touch panel 1506. In the latter case, an arrow button is displayed at an appropriate place in the game screen to accept the touch operation.

When all cookies 14 and power cookies 15 in the original space are collected, the cookies 14 and the power cookies 15 are disposed again in the initial arrangement state. Alternatively, the game may be configured such that the player clears a stage when he/she collects all the cookies 14 and the like, and moves to a subsequent stage having a different shape of the maze and a different arrangement of the cookies 14 and the like.

Figure 4:
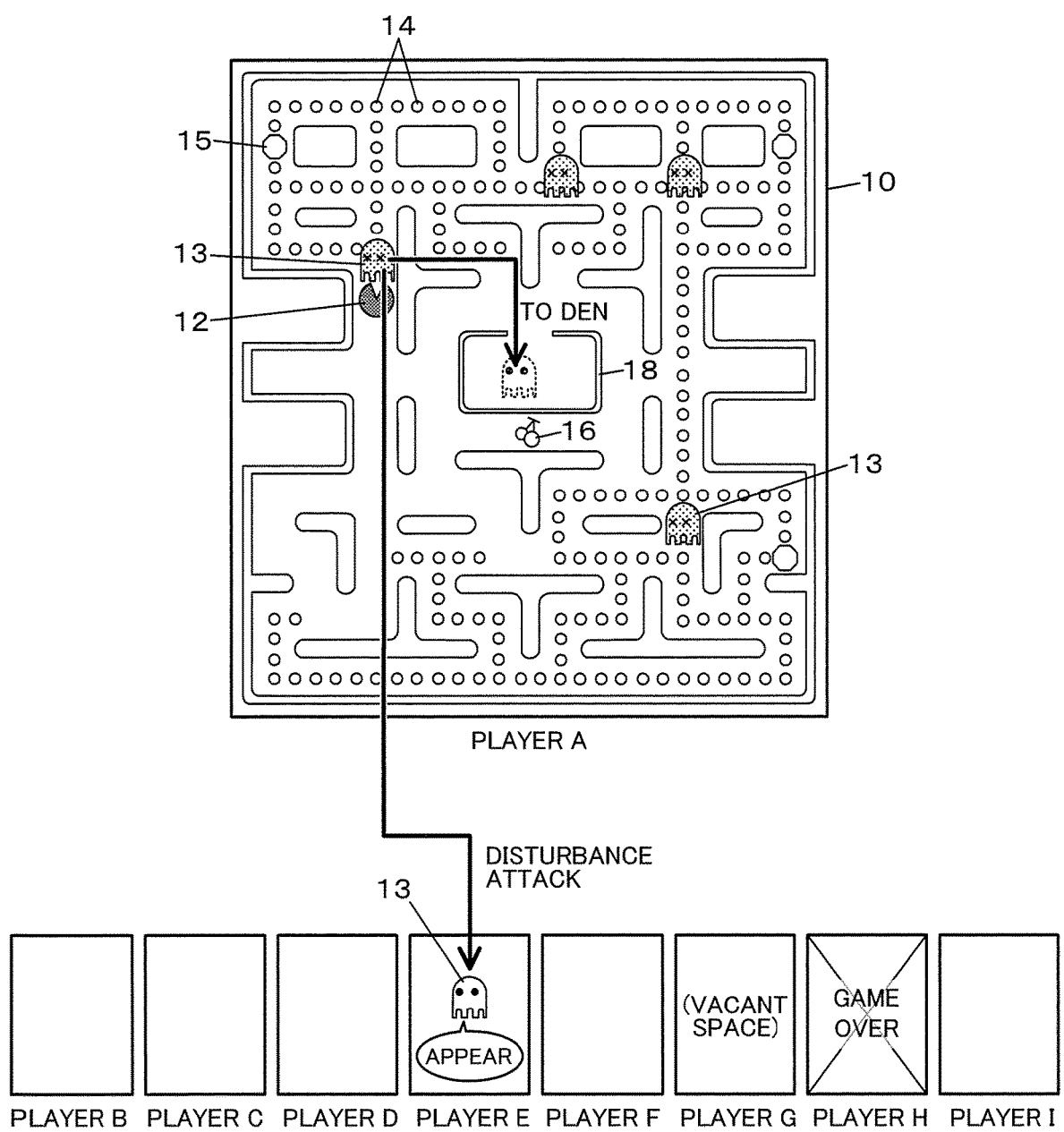
FIG. 4 is a diagram illustrating a disturbance attack.

When the player collects the power cookie 15, all the enemy characters 13 in the original space change from a "normal state" shown in FIG. 3 to a "weak state" shown in FIG. 4 for a predetermined time period. Then, the player brings the player character 12 into contact with the enemy character 13 in the weak state to defeat the enemy character 13. The defeated enemy character 13 returns to the den 18, waits for a certain time period, and resumes pursuing movement. Meanwhile, the enemy characters 13 return to the normal state when the predetermined time period has elapsed after the collection of the power cookie 15.

The fruit 16 is disposed at a predetermined position in the maze for a predetermined time period when the number of collected cookies 14 and power cookies 15 reaches a predetermined number. Collecting the fruit 16 adds a bonus score to the game score in accordance with a type of the fruit 16.

To sum it up, the player moves the player character 12 in the maze in the original space, collects the cookies 14 and the like while avoiding the enemy characters 13. When the player collects the power cookie 15, the player brings the player character 12 into contact with the enemy characters 13 in the weak state to defeat the enemy characters 13. While performing such basic gameplay, the player attacks the opponent players by performing the disturbance attacks to disturb the gameplay of the opponent players and the transfer attacks to directly confront the opponent players by moving in the game spaces of the opponent players, as appropriate, to outlive the opponent players.

1. Disturbance Attack

In the disturbance attack in accordance with the present embodiment, a disturbance target player is selected from the players other than a source player who has satisfied a disturbance element generation condition. The source player causes an enemy character to appear (to be generated) in the game space (the disturbance target space) being used by the disturbance target player for performing the gameplay as a disturbing object for disturbing the gameplay of the disturbance target player. FIG. 4 is a diagram illustrating the disturbance attack, and shows an example of the disturbance attack when a player A has satisfied the disturbance element generation condition.

First, the disturbance element generation condition is that "the player has defeated the enemy character", for example. Accordingly, as illustrated in the content displayed in the game image display section 10 of the player A in an upper part of FIG. 4, the player A satisfies the disturbance element generation condition when the player A brings the player character 12 into contact with the enemy character 13 in the weak state caused by the collection of the power cookie 15, and thus the player A becomes the source player. Then, when the enemy character 13 returns to the den 18, the enemy character 13 simultaneously appears in the game space of the disturbance target player (a player E in the example in FIG. 4) other than the player A. The appeared enemy character 13 starts pursuing the player character in the disturbance target space just like other enemy characters to disturb the gameplay of the disturbance target player E.

Regarding a procedure, first, when any one of the players satisfies the disturbance element generation condition, this player is set as the source player.

Then, the disturbance target determination process is performed to determine the disturbance target space in accordance with the disturbance target selection operation made by the source player in the disturbance target selection section 40. In accordance with the present embodiment, the disturbance target space is determined in a following manner from the game spaces of all the players whose games are not over yet. In the example in FIG. 4, the disturbance target space is determined from the game spaces of seven players B to G and I.

Specifically, when the random button 41 is selected in the disturbance target selection section 40 in FIG. 3, the disturbance target player is selected from the opponent players at random and the game space of the selected opponent player is determined as the disturbance target space.

When the vacant space button 42 is selected, the disturbance target space is selected from the game spaces in a vacant state (hereinafter referred to as a "vacant space" state) in which the player is absent due to the transfer to the game space (the transfer destination space) of another opponent player, and the player of the selected game space is determined as the disturbance target player. In the example in FIG. 4, the game space of a player G is the "vacant space" and thus is determined as the disturbance target space.

When the counter button 43 is selected, the disturbance target player is selected from the players who have performed the disturbance attack or the transfer attack to the source player, and the game space of the selected player is determined as the disturbance target space. The disturbance target player may be selected from the players who have performed the disturbance attack to the source player, or may be selected from the players who have performed the transfer attack to the source player. Alternatively, the disturbance target player may be selected from the players who have performed both the disturbance attack and the transfer attack to the source player.

When the high-level player button 44 is selected, the disturbance target player is selected from the players whose levels are equal to or higher than a predetermined level and the game space of the selected player is determined as the disturbance target space.

When the player selection acceptance button 45 is selected, the selection operation by the source player for selecting the disturbance target player is accepted when the disturbance element generation condition is satisfied. For example, the selection operation is accepted through the touch operation or the like on the opponent space status display section 30. Then, the game space of the selected disturbance target player is determined as the disturbance target space.

After the determination of the disturbance target space, the appearing enemy number determination process is performed to determine the number of enemies to appear based on the gauge value of the cookie gauge of the source player.

Also, a reference speed adjustment process is performed to set the moving speed (applied moving speed) applied to the enemy character to appear. In accordance with the present embodiment, predetermined moving speed (reference speed) of the enemy character is adjusted based on the level of the source player. For example, a correspondence relation between the level and an adjustment value is predetermined. Then, the reference speed is adjusted by the adjustment value corresponding to the level of the source player, and the adjusted speed is set as the applied moving speed. The adjustment value is preferably predetermined as a value adjusting the reference speed faster as the level is higher.

Then, the enemy character of the determined number is made to appear in the disturbance target space and to pursue the player character at the applied moving speed.

As a result, the disturbance attack described above can cause the enemy character to appear in the game space of the opponent player and disturb the gameplay of the opponent player. That is, the number of enemy characters increases in the disturbance target space receiving the disturbance attack, which increases a risk of incident that the player character cannot avoid the enemy character and makes contact with the enemy character. Accordingly, the player can indirectly drive the disturbance target player into game over.

In addition, the number of enemy characters to appear can be increased by defeating the enemy character after raising the gauge value of the cookie gauge by collecting the cookies. As described above, the number of enemy characters can be increased by up to three in accordance with the present embodiment. Meanwhile, the enemy character made to appear in the disturbance target space by the disturbance attack by a high-level player moves faster than the reference speed. As described above, the level rises by repeating the disturbance attack or the transfer attack. Accordingly, playing the game while raising the level, and measuring a timing of the disturbance attack in consideration of the gauge value of the cookie gauge allows the player to more effectively drive the disturbance target player into the game over.

Then, when the player character in the disturbance target space is actually defeated by coming into contact with the enemy character in relation to the disturbance attack, a result of the disturbance attack (a disturbance result) is considered as a "success" and reflected to the game score and the level. Specifically, a disturbance score is added to the game score of the source player, and the total number of successful attacks of the source player is updated to raise the level.

2. Transfer Attack

Figure 5:
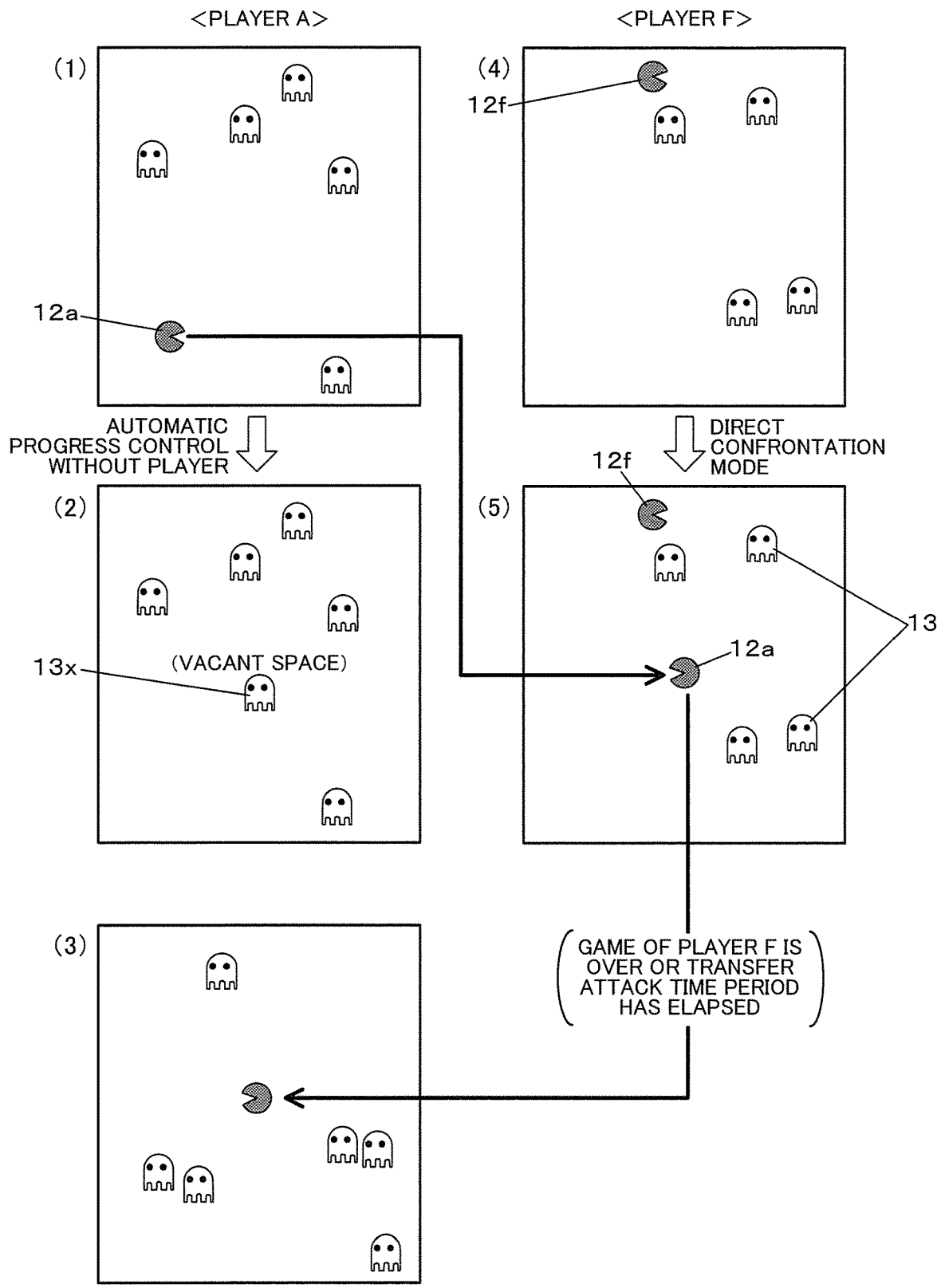
FIG. 5 is a diagram illustrating a transfer attack.

In the transfer attack in accordance with the present embodiment, a play space of an executing player who has satisfied a transfer execution condition is temporality changed from his/her original space to another game space (the transfer destination space). FIG. 5 is a diagram illustrating the transfer attack, and shows an example where the player A transfers to the game space of a player F as the transfer destination space. Images (1) to (3) on the left in FIG. 5 illustrate the game space of the player A (the executing player) performing the transfer attack by omitting the maze or the like to simplify, and images (4) and (5) on the right illustrate the game space, similarly simplified, of the player F (the transfer destination player) receiving the transfer attack.

First, the transfer execution condition is that "the player has performed an execution operation of the transfer attack", for example. That is, when any one of the players performs the touch operation on the attack button 67 in the transfer destination selection section 60 to perform the execution operation for the transfer attack, this player is set as the executing player. The transfer execution condition is not limited to this, and may be a different condition such as that "the player has collected a specific fruit". In such a case, when any one of the players collects the specific fruit, this player is set as the executing player.

Then, the transfer destination determination process is performed to determine the transfer destination space in accordance with the transfer destination selection operation made by the executing player in the transfer destination selection section 60. In accordance with the present embodiment, the transfer destination space is determined in a following manner from the game spaces that are not designated as the transfer destination spaces at the time of the execution operation. That is, in accordance with the present embodiment, the number of players who can transfer to one game space around the same time is limited to one. However, the number may not be limited, and any number of players may transfer to one game space around the same time. In such a case, the transfer destination space can be determined from the game spaces including the game space designated as the transfer destination space.

Specifically, when the random button 61 is selected in the transfer destination selection section 60 in FIG. 3, the transfer destination player is selected from the opponent players at random and the game space of the selected opponent player is determined as the transfer destination space.

When the vacant space button 62 is selected, the transfer destination space is selected from the game spaces in the "vacant space" state, and the selected game space is determined as the transfer destination space.

When the counter button 63 is selected, the transfer destination player is selected from the players who have performed the disturbance attack or the transfer attack to the executing player, and the game space of the selected player is determined as the transfer destination space. The transfer destination player may be selected from the players who have performed the disturbance attack to the executing player, or may be selected from the players who have performed the transfer attack to the executing player. Alternatively, the transfer destination player may be selected from the players who have performed both the disturbance attack and the transfer attack to the executing player.

When the high-level player button 64 is selected, the transfer destination player is selected from the players whose levels are equal to or higher than a predetermined level, and the game space of the selected player is determined as the transfer destination space.

When the player selection acceptance button 65 is selected, the selection operation by the executing player for selecting the transfer destination player is accepted when the transfer execution condition is satisfied. For example, the selection operation is accepted through the touch operation or the like on the opponent space status display section 30. Then, the game space of the selected transfer destination player is determined as the transfer destination space.

Then, after the determination of the transfer destination space, a notification control is performed to the player terminal 1500 of the transfer destination player to notify of transfer of an opponent player (that a player character of an opponent player is coming in). A notification method is not particularly limited, and a message notifying of the transfer of the opponent player may be displayed, or a display effect to notify of the transfer may be displayed in the game image display section 10 or the like.

Then, the play space of the executing player is changed to the transfer destination space. For example, assume that the game space of the player F is determined as the transfer destination space when the player A performs the touch operation on the attack button 67 in a state illustrated in the image (1) in FIG. 5. In this case, the player character 12*a* of the player A transfers to the game space of the player F illustrated in the image (4) in FIG. 5. That is, as illustrated in the image (5) in FIG. 5, the player character 12*a* of the executing player A appears in the game space of the transfer destination player F, which serves as the transfer destination space, and the direct confrontation mode between the executing player A and the transfer destination player F starts.

Meanwhile, as illustrated in the image (2) in FIG. 5, the game space of the executing player A becomes the "vacant space" without the player character after the player character 12*a* has transferred. In accordance with the present embodiment, progress of the game space in the "vacant space" state is automatically controlled in a state without the player. The game space in the "vacant space" state is subjected to the disturbance attack by a source player selecting the vacant space button 42 described above, and a new enemy character may appear (e.g., an enemy character 13*x*). In addition, the game space is also subjected to the transfer attack by an executing player selecting the vacant space button 62 described above, and the player character of the executing player may appear.

The player character 12*a* of the executing player A returns to the original space when a transfer termination condition described later is satisfied. At this time, the number of enemy characters may have increased compared to the number before the transfer, or the player character of the opponent player may be waiting. That is, the transfer attack allows the player to defeat the opponent player or to raise the level; however, it also involves a risk of disadvantageous situation after the player returns to the original space. On the other hand, if the player can put the increased enemy characters into the weak state while successfully avoiding them, and defeat them, the player can have more opportunities to make the disturbance attack to the opponent player.

The player A and the player F perform the basic gameplay also in the direct confrontation mode, avoiding the enemy characters and collecting the cookies and the like. However, when one of the player characters collects the power cookie, the other one of the player characters is put into the weak state as well as the enemy characters in the direct confrontation mode. The player character in the weak state cannot collect the cookies and the like even if the player character makes contact with the cookies and the like. When the player character makes contact with the player character in the normal state, the player character is defeated by the player character in the normal state and disappears. For example, when the executing player A collects the power cookie in the state illustrated in the image (5) in FIG. 5, the player character 12*f* of the transfer destination player F is put into the weak state along with the enemy characters 13. Then, if the executing player A can bring the player character 12*a* into contact with the player character 12*f* before the player character 12*f* returns to the normal state due to an elapse of the predetermined time period, the player A can defeat the player character 12*f*. In such a case, when the number of remaining lives of the player character 12*f* is zero, the game of the transfer destination player F is over. In a reverse case, the game of the executing player A is over.

Then, when one of the player characters has actually defeated the other player character, the result is reflected to the game score and the level. Specifically, a winning score is added to the game score of the wining player. In addition, when the executing player making the transfer attack wins, the result of the transfer attack is a "success". Accordingly, the total number of successful attacks of the executing player is updated to raise the level.

The direct confrontation mode is terminated when the transfer termination condition is satisfied. The transfer termination condition includes that the game of any one of the players is over. Specifically, the transfer termination condition is described as an OR condition between that "the game of the executing player or the transfer destination player is over" and that "a predetermined time period for the transfer attack has elapsed since the executing player has transferred to the transfer destination space", for example. Accordingly, when the transfer termination condition is satisfied by the elapse of the time period for the transfer attack, the player character 12*a* of the executing player A returns to the original space, the progress of which has been automatically controlled until this time, as illustrated in the image (3) in FIG. 5.

The transfer termination condition is not limited to the OR condition described above. For example, the transfer termination condition may be only that "the game of the executing player or the transfer destination player is over". In such a case, when the player executes or receives the transfer attack, the player cannot avoid game over unless the player defeats the opponent.

Alternatively, the transfer termination condition may be that "the executing player or the transfer destination player have received predetermined damage". For example, when any one of the player characters is defeated and one life of the defeated player character disappears, regardless of whether the game is over, the direct confrontation mode may be terminated.

Alternatively, the transfer termination condition may be that "a player character of another opponent player appears in the game space of the executing player". In such a case, even if the executing player is performing the transfer attack, the direct confrontation mode is forcibly terminated when the player character of another opponent player appears in the original space in the "vacant space" state caused by the transfer attack of the executing player.

[Functional Configuration]

1. Server System

Figure 6:
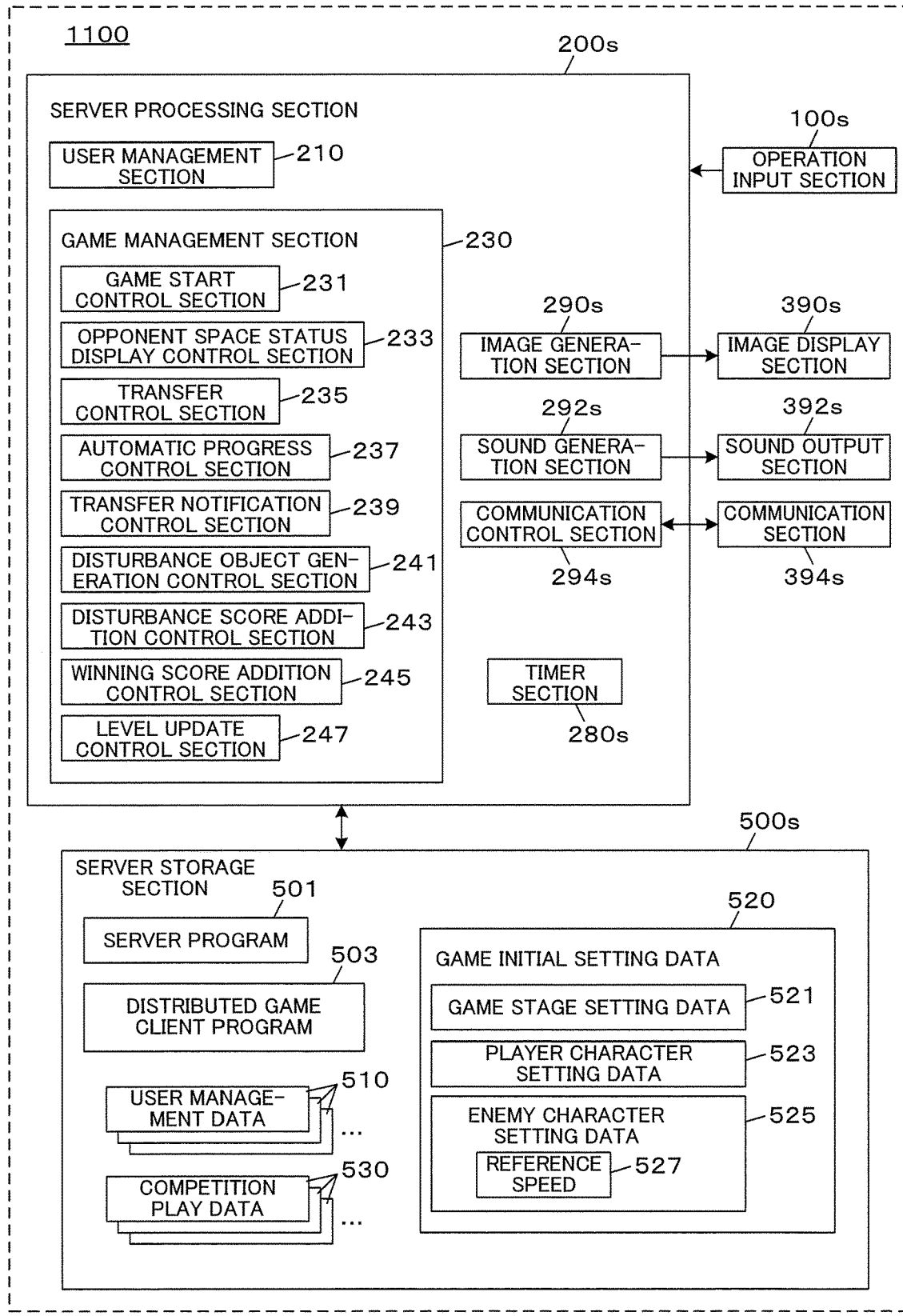
FIG. 6 is a block diagram illustrating an example of a functional configuration of a server system.

FIG. 6 is a block diagram illustrating an example of a functional configuration of the server system 1100. As illustrated in FIG. 6, the server system 1100 in accordance with the present embodiment includes an operation input section 100*s*, a server processing section 200*s*, an image display section 390*s*, a sound output section 392*s*, a communication section 394*s*, and a server storage section 500*s*.

The operation input section 100*s* is a means for inputting various operations for system management and maintenance, and is implemented by, for example, a keyboard, a mouse, or a touch panel. The operation input section 100*s* corresponds to the keyboard 1106 and the touch panel 1108 illustrated in FIG. 1.

The server processing section 200*s* is implemented, for example, by a processor including an arithmetic circuit such as a CPU, a GPU, an ASIC, or an FPGA and an electronic component such as an IC memory. The server processing section 200*s* controls input/output of data between device sections including the operation input section 100s and the server storage section 500s. The server processing section 200s performs various calculation processes based on a predetermined program, data, an operation input signal from the operation input section 100s, and data received from the player terminal 1500 to integrally control the operation of the server system 1100. The server processing section 200s corresponds to the control board 1150 and the CPU 1151 thereon illustrated in FIG. 1.

The server processing section 200s includes a user management section 210, a game management section 230, a timer section 280s, an image generation section 290s, a sound generation section 292s, and a communication control section 294s. The user management section 210 performs a process related to user registration and manages the data of each registered user (player) associated with a user account. For example, the user management section 210 can perform an issuing process of issuing a unique account to the registered user, a registration information management process of registering and managing personal information for each account, and a play history management process of managing a history of login and logout or the like. Of course, any other management processes for other data associated with the user account can be included as appropriate.

The game management section 230 performs various processes related to game execution management. In accordance with the present embodiment, a multi-play game is implemented as a client-server online game. Thus, the game management section 230 communicates with the player terminal 1500 to perform a control to provide data required for gameplay. In order to provide the data, the game management section 230 can perform processes in relation to a game progress control and a reflection of a game result including: 1) a matching process of players participating in the game; 2) a process for setting the game space by arranging background objects and items; 3) a process for disposing a player character in the game space and controlling behavior of the player character in accordance with the operation input through the player terminal 1500; 4) a process for disposing and controlling a virtual camera in the game space; 5) a process for disposing the enemy characters in the game space and automatically controlling behavior of the enemy characters; 6) a process for determining and reflecting contact among the player character, the enemy characters, and the items; 7) a process for generating an image of the game space as seen from the virtual camera as a game image; and 8) a determination process for determining whether a termination condition of the game is satisfied. Accordingly, the game management section 230 can also store various types of data required for controlling the gameplay in the server storage section 500s.

The game management section 230 includes a game start control section 231, an opponent space status display control section 233, a transfer control section 235, an automatic progress control section 237, a transfer notification control section 239, a disturbance object generation control section 241, a disturbance score addition control section 243, a winning score addition control section 245, and a level update control section 247.

The game start control section 231 performs a game start control including setting the game space for each player as an initial state, disposing the player character of the player, the enemy characters, and the virtual camera in each game space, and allowing each player to start the gameplay in his/her own game space.

The opponent space status display control section 233 performs a control for displaying information about the status of at least one game space other than the game space being used by the player himself/herself for performing the gameplay on the player terminal 1500 of each player. This corresponds to the display of the opponent space status display section 30 (see FIG. 3) for each opponent player in the game screen.

The transfer control section 235 performs a control for transferring the player character of the executing player satisfying the given transfer execution condition from the game space being used by the executing player for playing the gameplay to another game space. In accordance with the present embodiment, the player who has performed the execution operation is set as the executing player. Then, the transfer control section 235 performs the transfer destination determination process to determine the transfer destination space, and changes the play space of the executing player from the original space to the transfer destination space to transfer the player character.

Furthermore, the transfer control section 235 performs a control for returning the player character of the executing player to the original game space used before the transfer when the given transfer termination condition is satisfied. In accordance with the present embodiment, the transfer control section 235 returns the player character of the executing player from the transfer destination space to the original space.

The automatic progress control section 237 performs a progress control for controlling the progress of the game space in the "vacant space" state in which the player character is absent as a result of the transfer control by the transfer control section 235.

The transfer notification control section 239 notifies the player terminal 1500 of the transfer destination player that the transfer control is to be performed by the transfer control section 235, before the transfer control is performed by the transfer control section 235 in response to the execution operation by the executing player.

The disturbance object generation control section 241 sets a player other than the source player satisfying the given disturbance element generation condition as the disturbance target player, and generates a disturbance object for disturbing the gameplay of the disturbance target player in the game space being used by the disturbance target player for playing the gameplay. In accordance with the present embodiment, the player who has defeated the enemy character is set as the source player, and the enemy character is set as the disturbance object. Then, the disturbance object generation control section 241 performs the appearing enemy number determination process to determine the number of enemies to appear, and performs the disturbance target determination process to determine the disturbance target space. Furthermore, the disturbance object generation control section 241 performs the reference speed adjustment process to set the applied moving speed of the enemy character to appear. Then, the disturbance object generation control section 241 makes the enemy character of the determined number appear in the disturbance target space and starts a control of the pursuing movement at the applied moving speed.

The disturbance score addition control section 243 adds and reflects the disturbance score to the game score of the source player when the disturbance attack ends successfully. Furthermore, the winning score addition control section 245 adds and reflects the winning score to the game score of the player who has defeated the player character of the opponent player in the direct confrontation mode.

The level update control section 247 calculates the total number of successful disturbance attacks and transfer attacks for each player, and updates the total number as the level of the player as needed.

The timer section 280s uses a system clock to measure the current date and time, a limited time period, and others.

The image generation section 290s generates images related to the system management of the server system 1100 or the like, and outputs the resultant to the image display section 390s.

The sound generation section 292s is implemented by execution of an IC or software for generating sound data and decoding, and generates or decodes sound data of operational sounds related to the system management of the server system 1100 and video distribution, and a background music (BGM), for example. Sound signals related to the system management are output to the sound output section 392s.

The communication control section 294s performs a communication connection and data process for data communication with an external device (e.g., the player terminal 1500) through the communication section 394s, and implements exchange of data with the external device.

The image display section 390s displays various screens for the system management based on the image signals input from the image generation section 290s. For example, the image display section 390s can be implemented by an image display device, such as a flat panel display, a projector, or a head-mounted display. The image display section 390s corresponds to the touch panel 1108 illustrated in FIG. 1.

The sound output section 392s receives the sound signals from the sound generation section 292s to emit the corresponding sounds. The sound output section 392s corresponds to a speaker (not illustrated) included in the main body device 1101 or the touch panel 1108 in FIG. 1.

The communication section 394s connects to the network N to implement communication. For example, the communication section 394s can be implemented by a transceiver, a modem, a terminal adaptor (TA), a jack for wired communication cable, a control circuit, or the like. The communication section 394s corresponds to the communication device 1153 illustrated in FIG. 1.

The server storage section 500s stores programs for causing the server system 1100 to operate to implement various functions included in the server system 1100 and data used during execution of the programs. The programs and the data are stored previously or temporarily at every process. For example, the server storage section 500s can be implemented by an IC memory such as a RAM or a ROM, a magnetic disc such as a hard disc, or an optical disc such as a compact disc read-only memory (CD-ROM) or a digital versatile disc (DVD). The server storage section 500s corresponds to the IC memory 1152 and the storage 1140 illustrated in FIG. 1.

Moreover, the server storage section 500s stores a server program 501, a distributed game client program 503, user management data 510, game initial setting data 520, and competition play data 530. In addition, the server storage section 500s stores necessary data such as a timer, a counter, or various flags as appropriate.

The server program 501 is a program for causing the server processing section 200s to function as the user management section 210 and the game management section 230. The server program 501 may include programs for causing the server processing section 200s to function as the image generation section 290s, the sound generation section 292s, and the communication control section 294s as appropriate.

The distributed game client program 503 is an original of a game client program 502 (see FIG. 8) downloaded to the player terminal 1500.

The user management data 510 is prepared for each player who has registered as a user, and includes various types of data for management related to the gameplay of the player including a player ID (an account), a play history, or the like.

The game initial setting data 520 includes various types of initial setting data necessary for executing the game. The game initial setting data 520 includes game stage setting data 521, player character setting data 523, and enemy character setting data 525.

The game stage setting data 521 includes initial setting data related to the maze-like stage 11 (see FIG. 3). For example, the game stage setting data 521 includes map data of the stage and initial arrangement data of various types of items such as the cookie.

The player character setting data 523 includes initial setting data related to the player character. For example, the player character setting data 523 includes model data of the player character and motion data used for motion control.

The enemy character setting data 525 includes initial setting data related to the enemy character. For example, the enemy character setting data 525 includes the reference speed 527 of the enemy character. In addition, the enemy character setting data 525 includes, for example, model data of the enemy character and movement pattern data defining the pursuing movement pattern.

Figure 7:
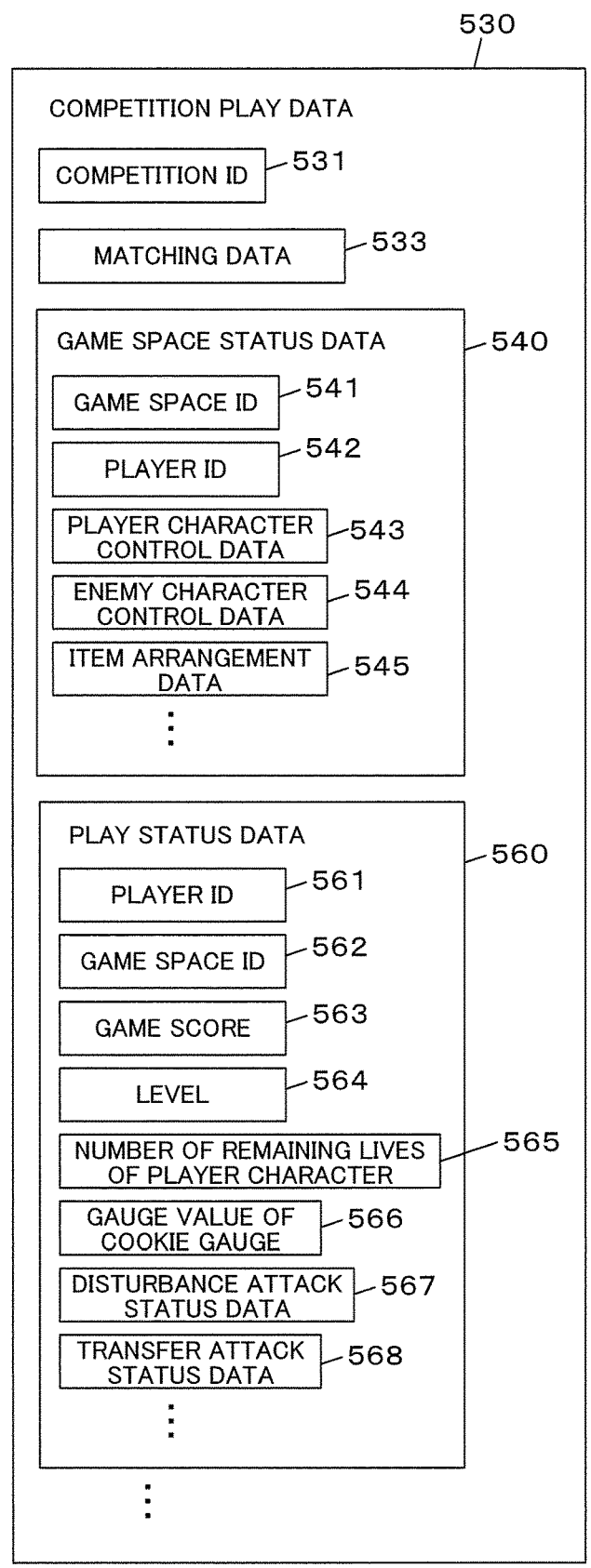
FIG. 7 is a diagram illustrating an example of a data configuration of competition play data.

The competition play data 530 is prepared for each competition game and includes various types of data describing the players participating in the competition game and game progress status. For example, as illustrated in FIG. 7, one competition play data 530 includes a competition ID 531, matching data 533, game space status data 540, and play status data 560.

The matching data 533 includes data of the players participating in the competition game. For example, the matching data 533 includes an account and a player name of each player, and a device ID of the player terminal 1500 used by each player.

The game space status data 540 is prepared for the game space of each player participating in the competition game and includes various types of data describing the status of the game space. For example, one game space status data 540 includes a game space ID 541 identifying the game space, a player ID 542 of the player using this game space as his/her original space for playing the game, player character control data 543, enemy character control data 544, and item arrangement data 545. Furthermore, the game space status data 540 includes various types of flag information including whether the game of the player using the game space as his/her original space is over, whether the game space is in the "vacant space" state, or whether the game space is designated as the transfer destination space.

The player character control data 543 is prepared for each player character in the game space, and includes various types of data describing the latest state in the stage 11 (the maze). For example, one player character control data 543 includes a player character ID identifying the player character, a current position in the maze, and posture. The player character existing in the game space is basically the player character of the player using the game space as his/her original space. However, another player character of the opponent player (the executing player) also exists while the player character of the opponent player is transferred.

Accordingly, another player character control data 543 related to the player character of the executing player is included as appropriate.

The enemy character control data 544 is prepared for each enemy character in the game space, and includes various types of data describing the latest state in the maze. For example, one enemy character control data 544 includes an enemy character ID identifying the enemy character, an applied moving speed, a disturbance flag, a current position in the maze, and posture. The disturbance flag is set with flag information about whether the enemy character is the one made to appear by the disturbance attack (if yes, "ON"/if no, "OFF").

In accordance with the present embodiment, the number of enemy characters at the beginning of the game is four. Thus, the game start control section 231 generates the enemy character control data 544 for the four enemy characters and stores the data in the game space status data 540 in the game start control. At this time, the applied moving speed is set to the reference speed 527 (see FIG. 6) as it is, and the disturbance flag is set to "OFF".

Meanwhile, when any one of the players satisfies the disturbance element generation condition during the game, the enemy character appears anew in the disturbance target space. For an appearance control of this enemy character, the disturbance object generation control section 241 adds the enemy character control data 544 to the game space status data 540 of the disturbance target space. With regard to a procedure, the disturbance object generation control section 241 determines the number of enemies to appear based on the gauge value 566 of the cookie gauge of the source player (i.e., the appearing enemy number determination process), and generates the enemy character control data 544 as many as the enemy to appear. At this time, the disturbance object generation control section 241 adjusts the reference speed 527 of the enemy character based on the level 564 of the source player and sets the adjusted speed as the applied moving speed (i.e., the reference speed adjustment process). It is preferable to set the applied moving speed faster as the level 564 of the source player is higher. The disturbance flag is set to "ON".

The item arrangement data 545 includes various types of data describing the latest arrangement state of the various items including the cookies, the power cookies, or the fruit in the maze.

The play status data 560 is prepared for each player participating in the competition game, and includes various types of data describing the play status of the game. For example, one play status data 560 includes a player ID 561 of the player, a game space ID 562 of the game space used as the original space by the player, a game score 563, a level 564, the number of remaining lives 565 of the player character, a gauge value 566 of the cookie gauge, disturbance attack status data 567, and transfer attack status data 568. In addition, the play status data 560 can also include, for example, the number of collection of each item such as the cookie as appropriate.

The disturbance attack status data 567 is generated whenever the player performs the disturbance attack to the opponent player (i.e., whenever the player defeats the enemy character), and includes various types of data related to the disturbance attack. For example, the disturbance attack status data 567 includes a player ID of the disturbance target player, a game space ID of the disturbance target space, an enemy character ID of the enemy character made to appear, or a disturbance result.

The transfer attack status data 568 is generated whenever the player performs the transfer attack to the opponent player (i.e., whenever the player performs the execution operation of the transfer attack), and includes various types of data related to the transfer attack. For example, the transfer attack status data 568 includes a player ID of the transfer destination player, a game space ID of the transfer destination space, or a transfer attack result.

2. Player Terminal

Figure 8:
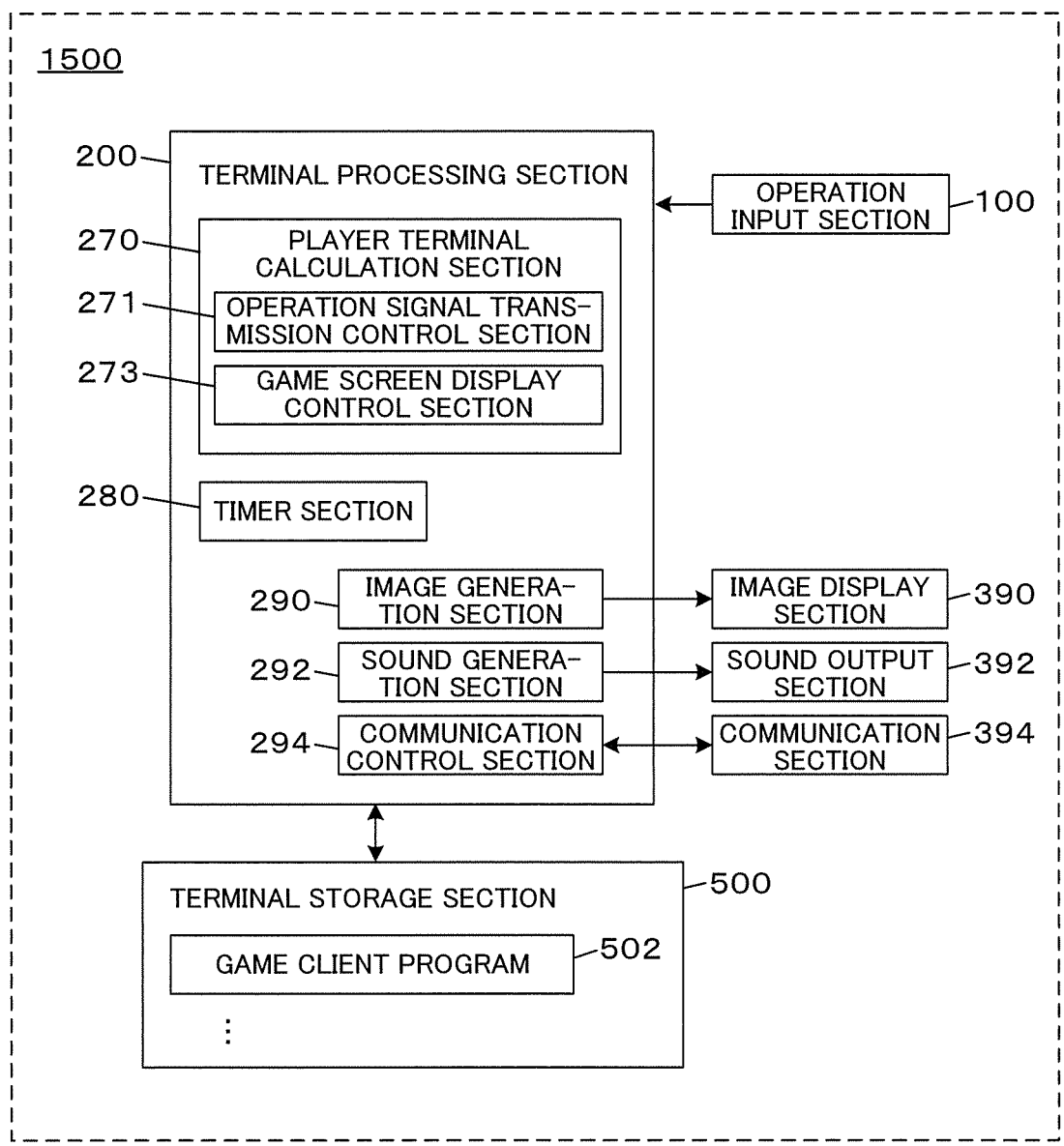
FIG. 8 is a block diagram illustrating an example of a functional configuration of the player terminal.

FIG. 8 is a block diagram illustrating an example of a functional configuration of the player terminal 1500. As illustrated in FIG. 8, the player terminal 1500 includes an operation input section 100, a terminal processing section 200, an image display section 390, a sound output section 392, a communication section 394, and a terminal storage section 500.

The operation input section 100 is used by the player to input various operations, and can be implemented, for example, by a button switch, a joystick, a touch pad, a track ball, an accelerometer, a gyro sensor, or a charge coupled device (CCD) module. The operation input section 100 corresponds to the arrow key 1502, the home key 1504, and the touch panel 1506 illustrated in FIG. 2.

The terminal processing section 200 is implemented, for example, by a processor including an arithmetic circuit such as a CPU, a GPU, an ASIC, or an FPGA and an electronic component such as an IC memory. The terminal processing section 200 controls input/output of data between the device sections including the operation input section 100 and the terminal storage section 500. The terminal processing section 200 performs various calculation processes based on a predetermined program, data, an operation input signal from the operation input section 100, and data received from the server system 1100 to integrally control the operation of the player terminal 1500. The terminal processing section 200 corresponds to the control board 1550 and the CPU 1551 thereon illustrated in FIG. 2. The terminal processing section 200 in accordance with the present embodiment includes a player terminal calculation section 270, a timer section 280, an image generation section 290, a sound generation section 292, and a communication control section 294.

The player terminal calculation section 270 performs various calculation processes to make the player terminal 1500 function as a terminal for the gameplay of the player. For example, the player terminal calculation section 270 includes an operation signal transmission control section 271 and a game screen display control section 273.

The operation signal transmission control section 271 performs a process of transmitting various types of data and request information to the server system 1100 in accordance with an operation input performed on the operation input section 100.

The game screen display control section 273 performs a control for displaying a game screen based on various types of data received from the server system 1100. For example, when the online game in accordance with the present embodiment is implemented as a web game, the game screen display control section 273 can be implemented by a web technology that actively controls the screen display using Java (registered trademark) and Cascading Style Sheet (CSS) along with a hypertext markup language (HTML) with a web browser as a base, such as a plugin of Adobe (registered trademark) Flash. Any other methods may be employed, of course. Furthermore, the game space image serving as a base of the game screen (e.g., three-dimensional computer graphics [3DCG]) is generated in the server system 1100 in the configuration in accordance with the present embodiment. However, the game space image may be generated in the player terminal 1500. In such a case, the game screen display control section 273 is in charge of controlling an object disposed in a virtual three-dimensional space for generating a 3DCG.

The image generation section 290 cooperates with the game screen display control section 273 to generate an image signal for displaying one game screen in every frame time (e.g., $\frac{1}{60}$th of a second) based on the various types of data received from the server system 1100, and to output the generated image signal of the game screen to the image display section 390. For example, the image generation section 290 can be implemented, for example, by a processor (e.g., a GPU or a DSP), a video signal IC, a program (e.g., a video codec), a drawing frame IC memory (e.g., a frame buffer).

The sound generation section 292 is implemented, for example, by a processor such as a DSP or a sound synthesizing IC, or an audio codec for playing a sound file, and generates a sound signal for sound effects, a BGM, various types of operational sounds related to the game, and outputs the generated signal to the sound output section 392.

The communication control section 294 performs a communication connection and data process for data communication with an external device (e.g., the server system 1100) through the communication section 394, and implements exchange of data with the external device.

The image display section 390 displays various game images such as the game screen based on the image signals input from the image generation section 290. For example, the image display section 390 can be implemented by an image display device, such as a flat panel display, a projector, or a head-mounted display. The image display section 390 corresponds to the touch panel 1506 illustrated in FIG. 2.

The sound output section 392 emits sounds such as sound effects and a BGM related to the game, based on the sound signal input from the sound generation section 292. The sound output section 392 corresponds to the speaker 1510 illustrated in FIG. 2.

The communication section 394 connects to the network N to implement communication. For example, the communication section 394 can be implemented by a transceiver, a modem, a TA, a jack for wired communication cable, or a control circuit. The communication section 394 corresponds to the wireless communication module 1553 illustrated in FIG. 2.

The terminal storage section 500 stores programs for causing the player terminal 1500 to operate to implement various functions included in the player terminal 1500 and data used during the execution of the programs. The programs and the data are stored previously or temporarily at every process. For example, the terminal storage section 500 can be implemented by an IC memory such as a RAM or a ROM, a magnetic disc such as a hard disc, or an optical disc such as a CD-ROM or a DVD. The terminal storage section 500 corresponds to the IC memory 1552 and the memory card 1540 illustrated in FIG. 2.

The terminal storage section 500 stores the game client program 502. The game client program 502 is a program for causing the terminal processing section 200 to function as the player terminal calculation section 270. The game client program 502 may be an exclusive client program or include a web browser program and a plugin that implements an interactive image display, depending on a technique and a method for implementing an online game. In accordance with the present embodiment, the game client program 502 is a copy of the distributed game client program 503 (see FIG. 6) provided from the server system 1100.

[Flow of Process]

Figure 9:
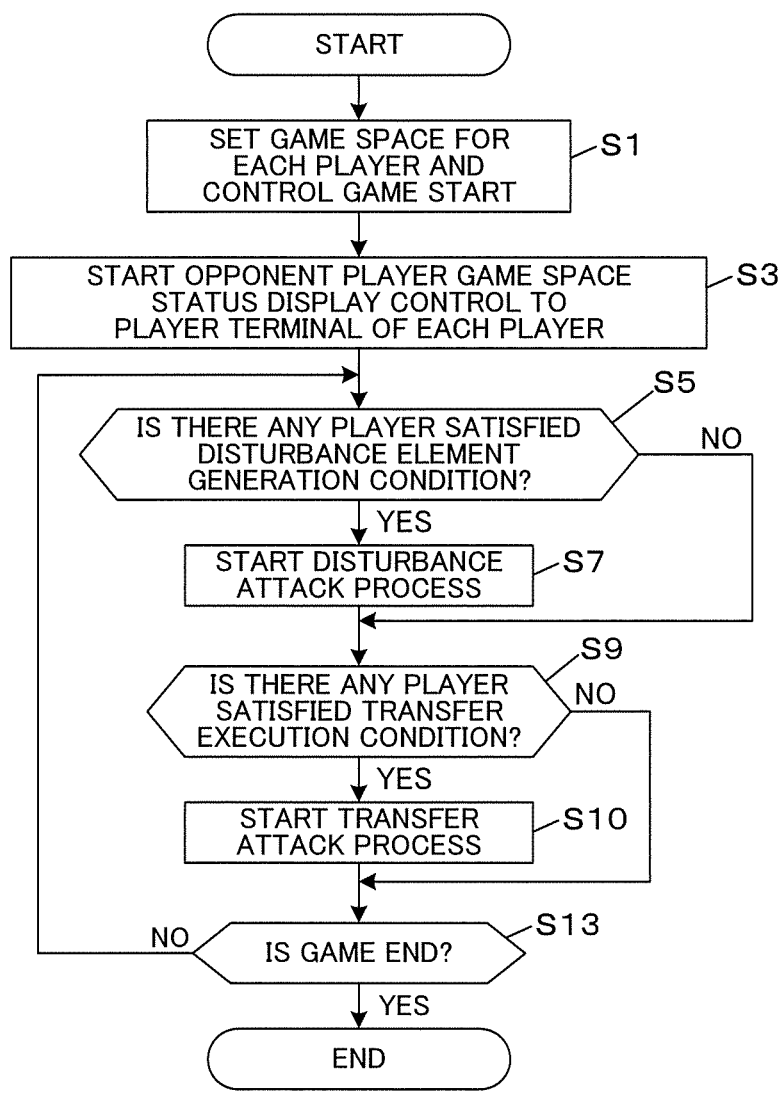
FIG. 9 is a flowchart illustrating a flow of a process in the server system.

FIG. 9 is a flowchart illustrating a flow of a process in the server system 1100 in accordance with the present embodiment, and shows a flow of a game process focusing on one competition game. The process as described herein is implemented by the server processing section 200s reading out and executing the server program 501. Assume that login procedures have been done separately with the player terminals 1500, and a formation of the players to compete with has been done through the matching process.

First, the game start control section 231 performs the game start control including setting the game space for each player as an initial state and allowing each player to start the gameplay in his/her own game space (step S1).

Then, the opponent space status display control section 233 starts the control for displaying information about the status of at least one game space other than the game space of the player himself/herself on the player terminal 1500 of each player (a game space status display control) (step S3).

Figure 10:
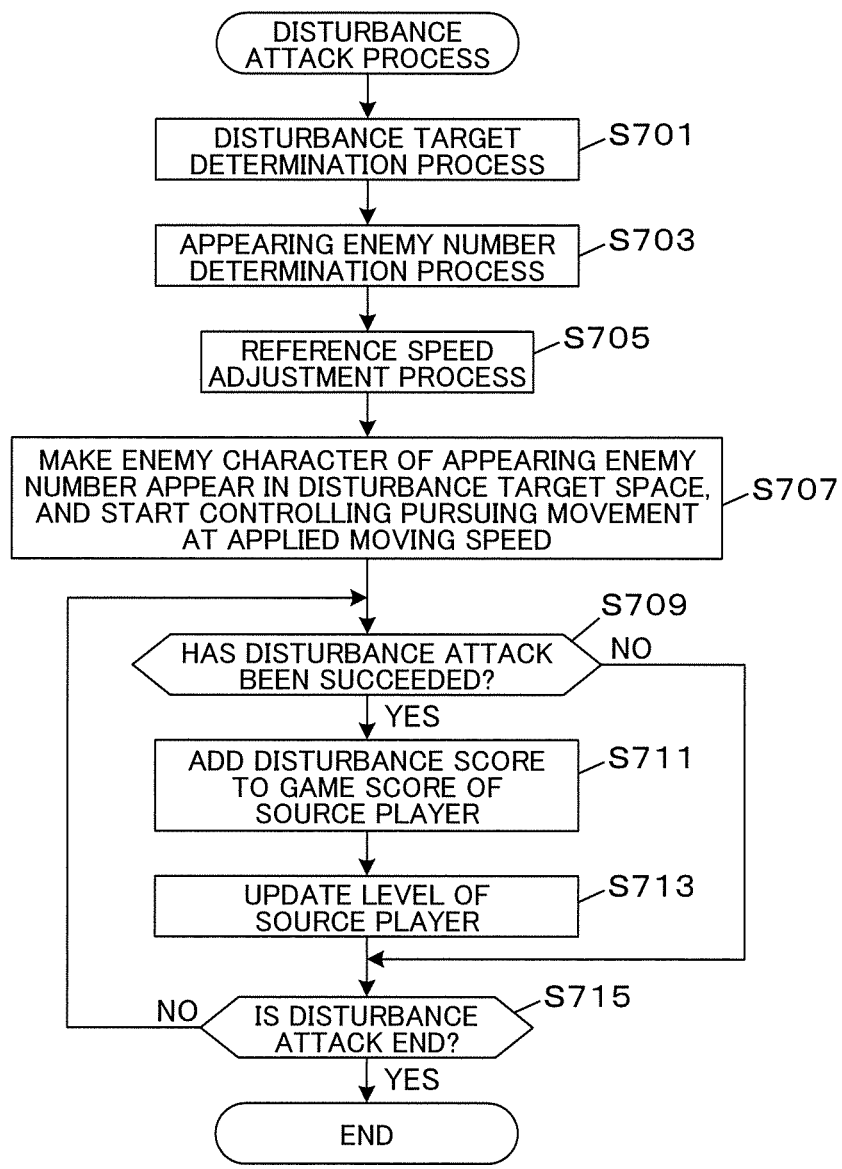
FIG. 10 is a flowchart illustrating a flow of a disturbance attack process.

Then, when any one of the players has satisfied the disturbance element generation condition during the game (step S5: YES), the disturbance attack process is started (step S7). FIG. 10 is a flowchart illustrating a flow of the disturbance attack process.

In the disturbance attack process, firstly, the disturbance object generation control section 241 performs the disturbance target determination process to determine the disturbance target space (step S701), the appearing enemy number determination process to determine the number of enemies to appear (step S703), and the reference speed adjustment process to set the applied moving speed of the enemy character to appear (step S705).

The disturbance object generation control section 241 makes the enemy character of the determined number, determined in the step S703, appear in the disturbance target space determined in the step S701, and starts the control for causing the appeared enemy character to perform the pursuing movement at the applied moving speed set in the step S705 (step S707).

Then, the disturbance object generation control section 241 monitors a disturbance result by the enemy character made to appear in the step S707. When the disturbance object generation control section 241 determines that the disturbance result is a "success" (step S709: YES), the disturbance score addition control section 243 adds the disturbance score to the game score of the source player (step S711) and the level update control section 247 updates the level of the source player (step S713).

When the termination condition, such as that the game of the disturbance target player is over, has been satisfied (step S715: YES), the disturbance object generation control section 241 terminates the disturbance attack process related to this disturbance attack.

Figure 11:
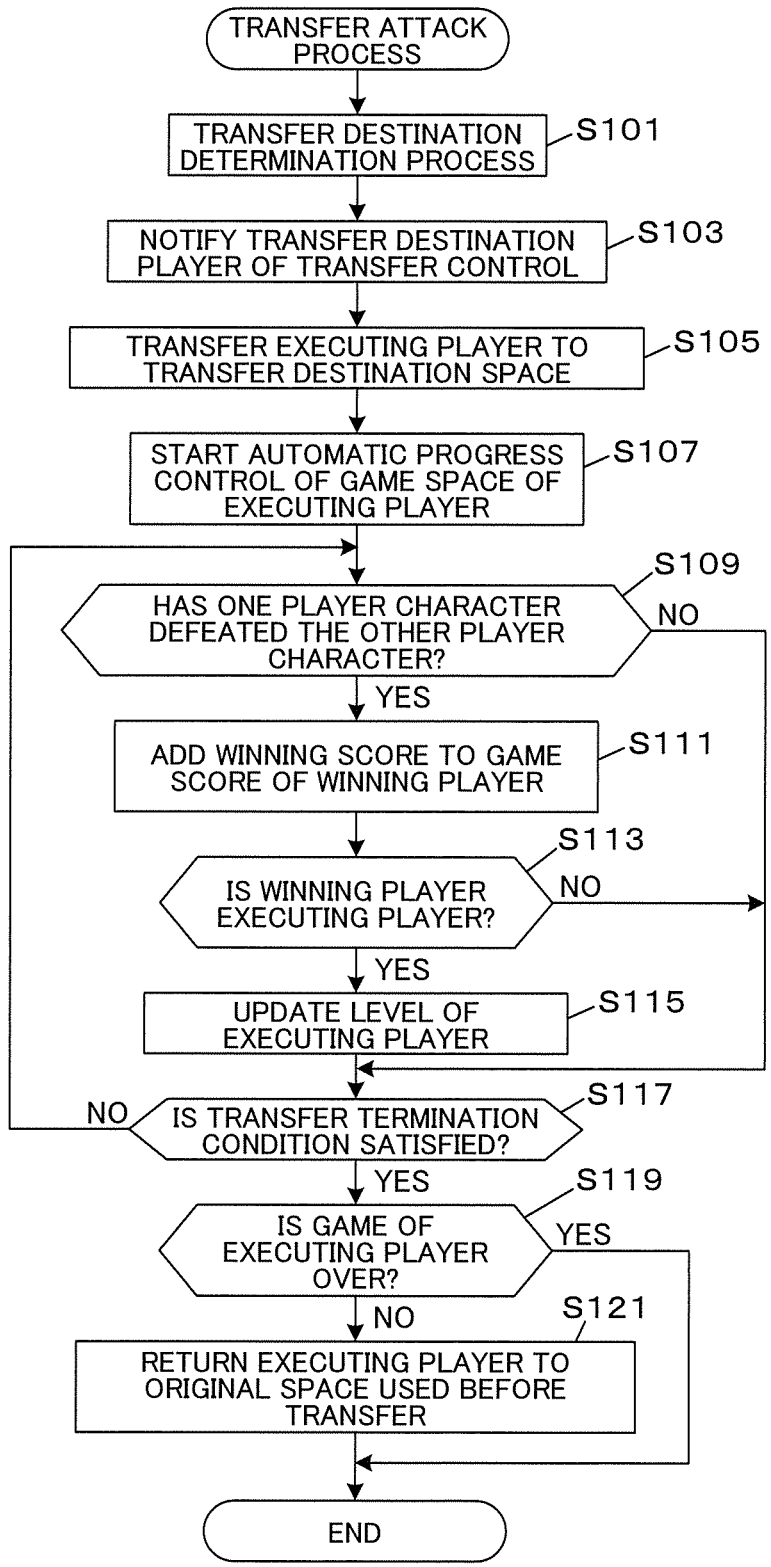
FIG. 11 is a flowchart illustrating a flow of a transfer attack process.

Referring back to FIG. 9, when any one of the players has satisfied the transfer execution condition during the game (step S9: YES), the transfer attack process is started (step S10). FIG. 11 is a flowchart illustrating a flow of the transfer attack process.

In the transfer attack process, firstly, the transfer control section 235 performs the transfer destination determination process to determine the transfer destination space (step S101). Then, the transfer notification control section 239 performs the notification control to the player terminal 1500 of the player (transfer destination player) in the transfer destination space determined in the step S101 to notify that the transfer control is to be performed by the transfer control section 235 (step S103).

Then, the transfer control section 235 transfers the player character of the executing player to the transfer destination space determined in the step S101 to shift to the direct confrontation mode (step S105). Then, the automatic progress control section 237 starts the automatic progress control of the game space of the executing player without the player character (step S107).

Then, the transfer control section 235 monitors a result of the transfer attack by the executing player. When one of the player characters has defeated the other one of the player characters (step S109: YES), the winning score addition control section 245 adds the winning score to the game score of the winning player (step S111). When the winning player is the executing player (step S113: YES), the level update control section 247 updates the level of the executing player (step S115). Also, when the winning player is the transfer destination player, the level update control section 247 may update the level of the transfer destination player.

Then, the transfer control section 235 monitors whether the transfer termination condition has been satisfied. When the transfer termination condition has been satisfied (step S117: YES), the transfer control section 235 terminates the direct confrontation mode. When the game of the executing player has not been over yet (step S119: NO), the transfer control section 235 returns the player character to the original space of the executing player used before the transfer (step S121).

Refer back to FIG. 9. The flow returns to the step S5 (step S13: NO) to repeat the processes described above until the competition game ends. Then, when the competition game ends (step S13: YES), this process is terminated.

As described above, in accordance with the present embodiment, the player participating in the game can perform the basic gameplay avoiding game over while disturbing the gameplay of the opponent player and directly moving in the game space of the opponent player to confront the opponent player. This can add new amusement to the competition system of the game for multiple players.

Note that the modes to which the present disclosure is applicable are not limited to the above-described embodiment, and the components can be added, omitted, or changed as appropriate.

Modification Example 1

In the above-described embodiment, the server system 1100 of the client-server game system 1000 is given as an example to which the present disclosure is applicable. However, this should not be construed in a limiting sense. For example, the present disclosure may be implemented by peer-to-peer connection among a plurality of player terminals 1500. In such a case, any one of the plurality of player terminals 1500 performs the functions of the server system 1100 in accordance with the above-described embodiment. Alternatively, the plurality of player terminals 1500 may share the functions of the game management section 230. Connecting the plurality of player terminals 1500 in such a manner constitutes a computer system.

Figure 12:
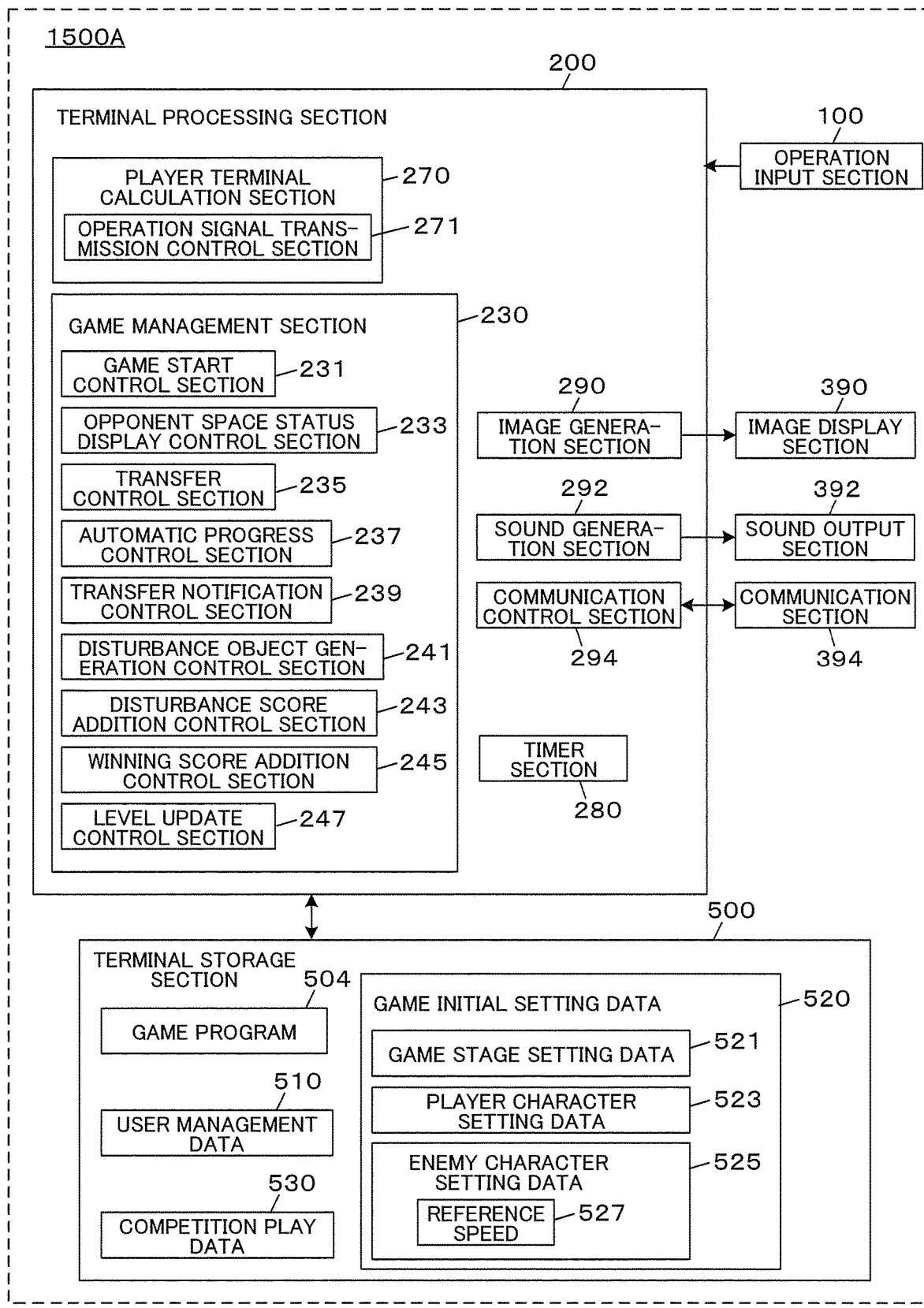
FIG. 12 is a diagram illustrating an example of a functional configuration of a player terminal in accordance with a modification example 1.

Specifically, FIG. 12 illustrates an example of a functional configuration of a player terminal 1500A sharing the functions of the server system 1100 in accordance with the above-described embodiment. In FIG. 12, common referential numerals are given to components similar to the components in the above-described embodiment. In this case, the server system 1100 mainly performs user registration, management of registration information, and matching, and provides the information in response to a request from the player terminal 1500A.

As illustrated in FIG. 12, in the player terminal 1500A in accordance with the present modification example, the terminal processing section 200 includes the game management section 230, and the game screen display control section 273 is omitted. That is, the player terminal 1500A in accordance with the present modification example does not acquire data for displaying an image of the game screen from the server system 1100, but the game management section 230 of the player terminal itself performs the process related to the game management to control the game progress, and generates the image of the game screen. The terminal storage section 500 of this player terminal 1500A stores a game program 504 for causing the terminal processing section 200 to function as the player terminal calculation section 270 and the game management section 230. The terminal storage section 500 also includes the user management data 510 related to the player using the player terminal 1500A, the competition play data 530 related to the gameplay that the player participates in, and the game initial setting data 520.

Flows of the processes performed by the player terminal 1500A in accordance with the present modification example are basically the same as the flows illustrated in the flowcharts in FIGS. 9 to 11. You may read that the game management section 230 of the player terminal 1500A performs the steps. Specifically, in the player terminal 1500A of each player participating in the game, the game start control section 231 performs the game start control including setting the game space to the player (the self player) using the player terminal 1500A. The opponent space status display control section 233 performs the control for displaying the information about the status of at least one game space of a player (an opponent player) using another player terminal 1500A. The transfer control section 235, the automatic progress control section 237, the transfer notification control section 239, the winning score addition control section 245, and the level update control section 247 perform the transfer attack process with the self player as the executing player. The disturbance object generation control section 241, the disturbance score addition control section 243, and the level update control section 247 perform the disturbance attack process with the self player as the source player.

The present modification example can provide the same advantageous effects as those in the above-described embodiment. The player terminal 1500 may be partially in charge of the functions of the game management section 230, instead of being entirely in charge of the functions.

Modification Example 2

Furthermore, in the above-mentioned embodiment, an example is given where the player character of the executing player who has performed the execution operation of the transfer attack is transferred from the original space to the game space of the transfer destination player. Alternatively, the game space of the executing player and the game space of the transfer destination player may be connected to allow the player character of the executing player to move to the game space of the transfer destination player. For example, this can be implemented by connecting a given position of the game space of the executing player with a given position of the game space of the transfer destination player to be passable.

Figure 13:
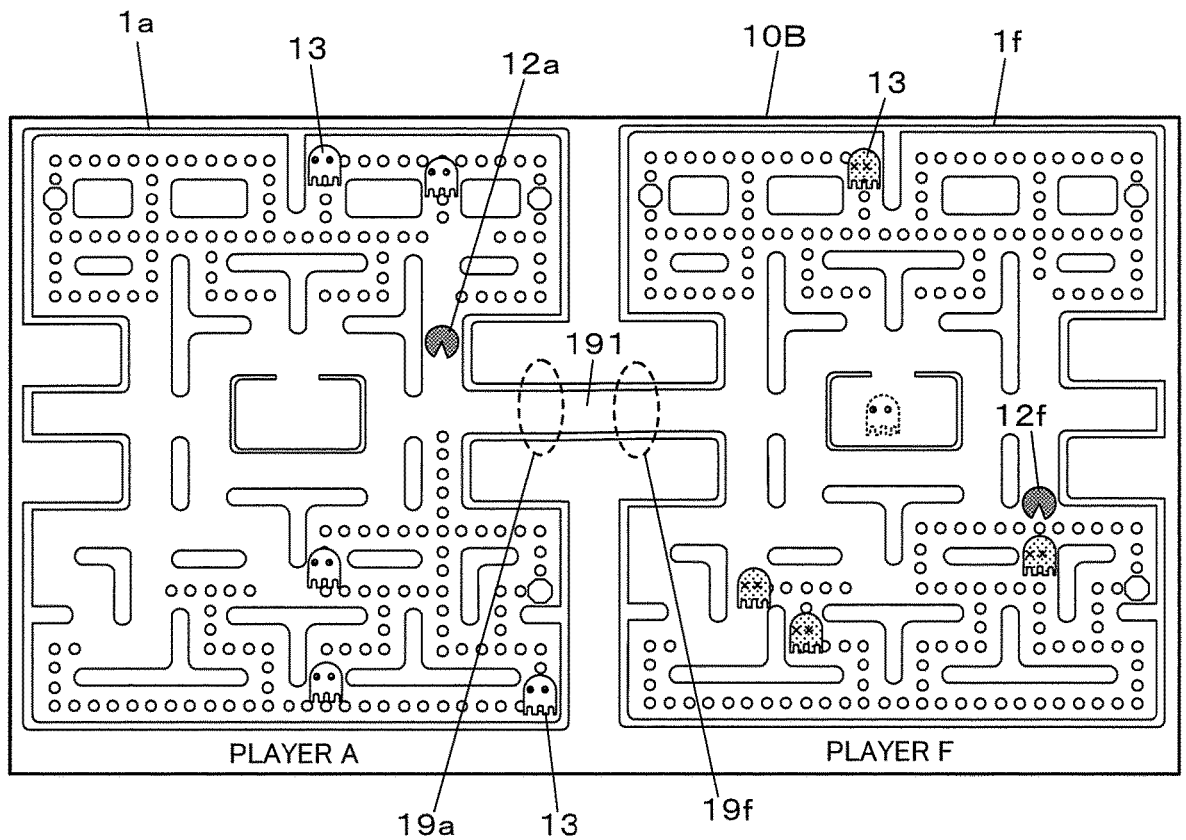
FIG. 13 is a diagram illustrating a display example of a game image display section in accordance with a modification example 2.

FIG. 13 is a diagram illustrating a display example of a game image display section 10B displayed on the player terminals 1500 and 1500A of the executing player and the transfer destination player at the time of the transfer attack in accordance with the present modification example. FIG. 13 illustrates a game space 1a of the executing player A on the left and a game space if of the transfer destination player F on the right.

As illustrated in FIG. 13, at the time of the transfer attack in accordance with the present modification example, the game space 1a and the game space if are connected by a passage 191 that connects a position 19a of the game space 1a with a position 19f of the game space if to allow the player characters 12a and 12f and the enemy characters 13 to come and go. The executing player A can cause the player character 12a to invade the game space if through the passage 191 to perform the gameplay in the game space of the transfer destination player as the play space.

Figure 14:
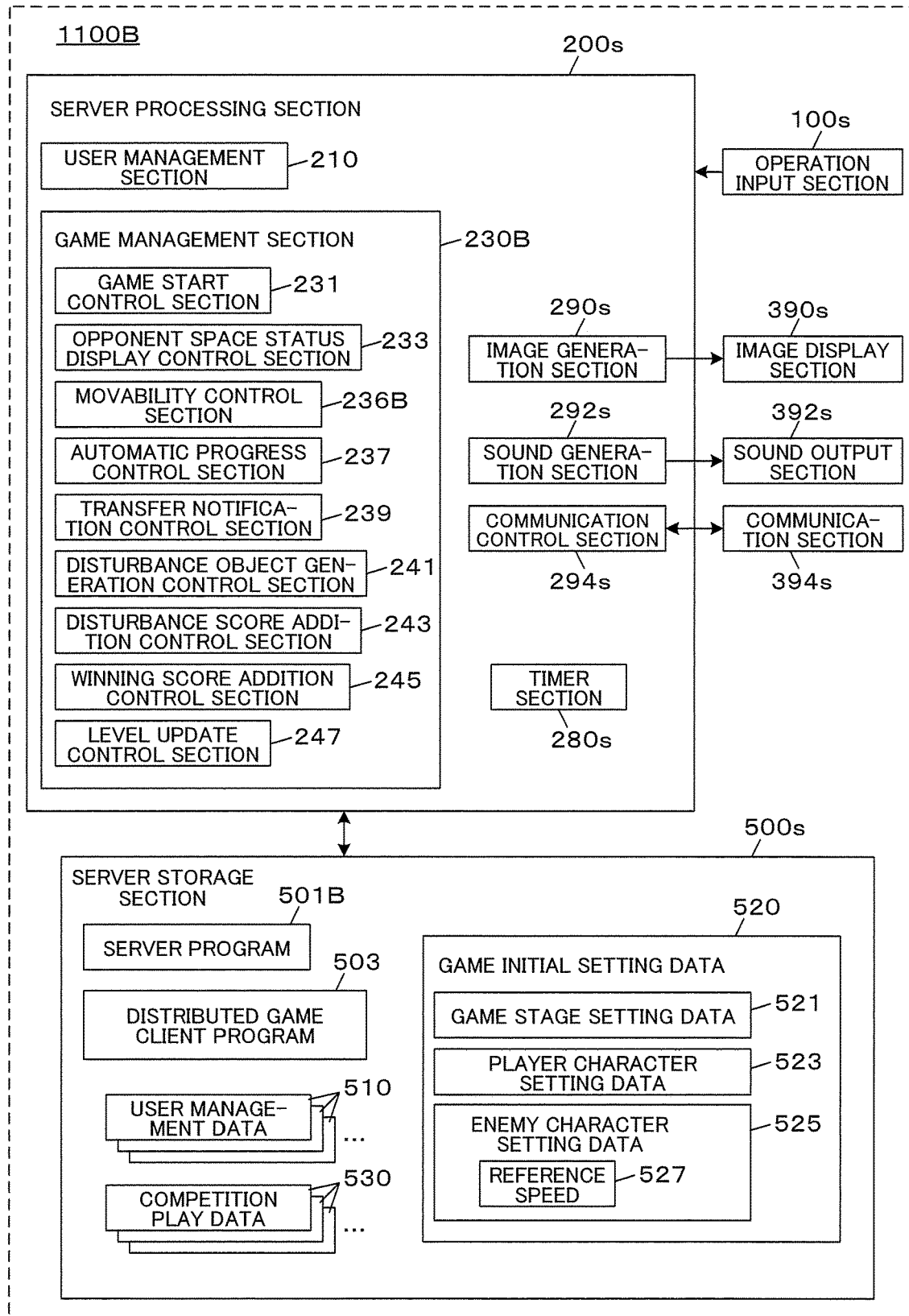
FIG. 14 is a block diagram illustrating an example of a functional configuration of a server system in accordance with the modification example 2.

FIG. 14 is a block diagram illustrating an example of a functional configuration of a server system 1100B in accordance with the present modification example. In FIG. 14, common referential numerals are given to components similar to the components in the above-described embodiment. As illustrated in FIG. 14, in the server system 1100B in accordance with the present modification example, a game management section 230B includes the game start control section 231, the opponent space status display control section 233, a movability control section 236B, the automatic progress control section 237, the transfer notification control section 239, the disturbance object generation control section 241, the disturbance score addition control section 243, the winning score addition control section 245, and the level update control section 247.

The storage section 500s includes a server program 501B that causes the server processing section 200s to function as the user management section 210 and a game management section 230B.

The movability control section 236B performs a movability control for connecting the game space of the executing player with the game space of the transfer destination player to allow the player character of the executing player to be movable to the game space of the transfer destination player, instead of the transfer control by the transfer control section 235 described in the above-described embodiment. The transfer control section 235 performs a control for releasing the connection between the game spaces when the given transfer termination condition is satisfied. For example, in the example illustrated in FIG. 13, the transfer control section 235 disposes the player characters 12a and 12f to their respective game spaces 1a and if and cuts off the passage 191 to return the player character 12a of the executing player A to the original space.

Modification Example 3

Furthermore, instead of transferring the executing player to another game space, another player performing the gameplay in another game space may be transferred to the game space being used by the executing player for performing the gameplay. That is, the player serving as the executing player may cause the other player to come to his/her game space.

In accordance with the present modification example, the transfer control section 235 of the server system 1100 performs processes below, instead of the transfer control described in the above-described embodiment. That is, the transfer control section 235 first determines a target opponent player or a target game space in a similar manner as in the transfer destination determination process. Then, the transfer control section 235 transfers the determined opponent player or the player in the determined game space to the game space of the executing player.

Modification Example 4

Furthermore, instead of transferring the executing player or the target player between their game spaces as described in the above-described embodiment and modification examples 2 and 3, the players may be transferred to a separately prepared game space for the direct confrontation mode. [Modification Example 5]

Furthermore, in the above-described embodiment, the number of enemies to appear at the time of the disturbance attack is determined based on the gauge value of the cookie gauge, and the enemy character of the determined number is made to appear in the game space of one disturbance target player. However, the number of disturbance target players may be variably controlled based on the gauge value of the cookie gauge, or both the numbers of disturbance target players and enemies to appear may be variably controlled. In the former case, for example, assuming that the number of enemies to appear is two or more, the disturbance target players as many as the enemies to appear may be determined from the players other than the source player. Then, the enemy characters may be generated one each in the game spaces of the determined two or more disturbance target players. In the latter case, for example, assuming that the number of enemies to appear is two or more, the disturbance target players as many as the enemies to appear may be selected. Then, the enemy characters as many as the enemies to appear may be generated in each game space.

Modification Example 6

Furthermore, additional effects of collecting the items such as the cookie or the fruit may be set as appropriate. For example, an offensive item used in the transfer attack may be provided in accordance with item collection status.

Alternatively, the game space of the player may be excluded from being a target of the disturbance attack or the transfer attack, in accordance with the item collection status, for example. For example, a given transfer block condition is predetermined as that "the player has collected specific fruit" or that "the player has collected cookies equal to or more than a predetermined ratio in the game space", or as a combination of these conditions. In addition, a disturbance block condition is predetermined with a similar content. Then, the game space of the player satisfying the transfer block condition is excluded from the selection in the transfer destination determination process, and the game space of the player satisfying the disturbance block condition is excluded from the selection in the disturbance target determination process so as to suppress the transfer attack or the disturbance attack to the game space. Specifically, as a transfer suppression control means, the transfer control section 235 determines whether the player in each game space not in the "vacant space" state satisfies the transfer block condition in the transfer destination determination process. When any of the players satisfies the condition, the transfer control section 235 excludes the game space of this player, and then performs the transfer destination determination process in the above-described manner. The disturbance object generation control section 241 determines in the similar manner whether the player satisfies the disturbance block condition in the disturbance target determination process. When any of the players satisfies the condition, the disturbance object generation control section 241 excludes the game space of this player, and then performs the disturbance target determination process.

Alternatively, a given selectability condition is predetermined similarly to the transfer block condition and the disturbance block condition. Then, in the disturbance target determination process or the transfer destination determination process, the disturbance target space or the transfer destination space may be determined from the game spaces of the players satisfying the selectability condition.

In addition, in the disturbance target determination process when the player selection acceptance button 45 is selected, the selection operation of the disturbance target player may be accepted only with the players satisfying the selectability condition as selectable options. Similarly, in the transfer destination determination process when the player selection acceptance button 65 is selected, the selection operation of the transfer destination player may be accepted only with the players satisfying the selectability condition as the selectable options.

Furthermore, the present modification example may be combined with the modification example 3. That is, the player satisfying the transfer block condition may be made unselectable, or only the player satisfying the selectability condition may be selectable in the selection of the player to be transferred to the game space of the executing player.

The selectability condition is not limited to the condition related to the item collection status, and may be set as a condition related to the level of the player playing the game in the disturbance target space or the transfer destination space. For example, the disturbance target space or the transfer destination space may be determined only from the game spaces of the players whose levels are equal to or higher than a predetermined level, or, on the contrary, only from the game spaces of the players whose levels are lower than a predetermined level.

Furthermore, the configuration of the maze and the arrangement of the items such as the cookies are identical in the game spaces of all players in the above-mentioned embodiment. Accordingly, it is possible to execute a mode to share the cookies in the maze with another game space in accordance with the item collection status. For example, such a mode is executed for a predetermined time period for a player who has collected specific fruit. The number of target opponent players may be one or more. For example, the number is determined by accepting a selection operation of the player who has collected the specific fruit. When the player collects the cookie or the power cookie in this mode, a control for causing the cookie or the like at the same position in the game space of the determined opponent player to disappear is performed. This can be a disturbance attack to the opponent player since the cookie supposed to be collected by the opponent player disappears.

Modification Example 7

Furthermore, in the above-described embodiment, the game space is set for each player, and the player plays the game in his/her original space, except when the player transfers to the game space of the opponent player. Alternatively, the original game space used before the transfer may disappear when the player transfers to the opponent space. The game space may remain as it is as a game space not associated with the player, of course. In such a case, for example, the player serving as the executing player transfers to the transfer destination space and the player (the transfer destination player) playing the game in the transfer destination space play the game in the transfer destination space. Then, when the game of one of the players is over, the other one of the players may continue his/her gameplay in this game space.

Furthermore, the present modification example may be combined with the modification example 2. That is, the passage 191 illustrated in FIG. 13 may be cut off when the player character 12a of the executing player A enters the game space if of the transfer destination player F to disable the executing player A to return to his/her original game space 1a used before the transfer.

Modification Example 8

Furthermore, in the above-described embodiment, an example is given where the disturbance target player is selected by the player selection acceptance button 45 and the touch operation on the opponent space status display section 30, as one of the disturbance target selection operation. However, it may be a selection operation for selecting the game space (disturbance target space) of the disturbance target that is accepted. Similarly, an example is given where the transfer destination player is selected by the player selection acceptance button 65 and the touch operation on the opponent space status display section 30, as one of the transfer destination selection operation. However, it may be a selection operation for selecting the game space (transfer destination space) of the transfer destination that is accepted.

Other Modification Examples

Furthermore, in the above-described embodiment, an example of the competition among multiple players is given; however, the competition may be against the computer. For example, when the competition game is performed with a fixed number of participants, such as 50, and the number of players expressing participation is less than the fixed number, computer-controlled characters as many as shortages may be added. In addition, this is not limited to the game generating the game image as a third person point-of-view image as in the above-described embodiment, and can be applicable to the game generating the game image as a first person point-of-view image as well.

Although only some embodiments of the present disclosure have been described in detail above, those skilled in the art will readily appreciate that many modifications are possible in the embodiments without materially departing from the novel teachings and advantages of this disclosure. Accordingly, all such modifications are intended to be included within scope of this disclosure.

What is claimed is:

1. A computer system comprising:
at least one processor or circuit programmed to:
perform a game start control comprising setting a game space for each player as an initial state and allowing the player to start gameplay where the player operates a player character in the game space;
perform a control for displaying information about status of at least one game space other than the game space being used by the player himself/herself for performing the gameplay on a computer device of each player;
perform a transfer control for transferring a player character of an executing player from a game space being used by the executing player for performing the gameplay to another game space, the executing player satisfying a given transfer execution condition; and perform a progress control of the game space by the transfer control in a state without the player character that is made absent.

2. The computer system as defined in claim 1, wherein the other game space is a game space being used by a player other than the executing player for performing the gameplay.

3. The computer system as defined in claim 1, wherein performing the transfer control comprises performing a control for returning the player character of the executing player to an original game space used before transfer, when a given transfer termination condition is satisfied.

4. The computer system as defined in claim 1, wherein performing the transfer control comprises determining the other game space based on an operation by the executing player for selecting the other game space or for selecting another player performing the gameplay in the other game space.

5. The computer system as defined in claim 4, wherein when the other game space is determined based on the operation by the executing player for selecting the other player performing the gameplay in the other game space, performing the transfer control comprises performing a control for accepting an operation for selecting the other player only with other players satisfying a given selectability condition as selectable options.

6. The computer system as defined in claim 1, wherein the at least one processor or circuit is further programmed to perform a control for suppressing the transfer control when another player performing the gameplay exists in the other game space and the other player satisfies a given transfer block condition based on an operation input from the other player.

7. The computer system as defined in claim 1, wherein the at least one processor or circuit is further programmed to notify the computer device of another player that the transfer control is to be performed, when the other player performing the gameplay exists in the other game space.

8. A computer system comprising:

at least one processor or circuit programmed to:

perform a game start control comprising setting a game space for each player as an initial state and allowing the player to start gameplay where the player operates a player character in the game space;

perform a control for displaying information about status of at least one game space other than the game space being used by the player himself/herself for performing the gameplay on a computer device of each player;

perform a transfer control for transferring a player character of another player performing the gameplay in another game space to a game space being used by an executing player for performing the gameplay, the executing player satisfying a given transfer execution condition; and generate a disturbance object for disturbing the gameplay of a disturbance target player in a game space being used by the disturbance target player for performing the gameplay, the disturbance target player being a player other than a source player satisfying a given disturbance element generation condition.

9. The computer system as defined in claim 8, wherein the at least one processor or circuit is further programmed to perform a control for selecting the other player from players satisfying a given selectability condition out of players other than the executing player.

10. The computer system as defined in claim 8, wherein the at least one processor or circuit is further programmed to suppress the transfer control when the other player performing the gameplay in the other game space satisfies a given transfer block condition based on an operation input from the other player.

11. The computer system as defined in claim 8, wherein the at least one processor or circuit is further programmed to notify the computer device of the other player performing the gameplay in the other game space that the transfer control is to be performed.

12. A computer system comprising:

at least one processor or circuit programmed to:

perform a game start control comprising setting a game space for each player as an initial state and allowing the player to start gameplay where the player operates a player character in the game space;

perform a control for displaying information about status of at least one game space other than the game space being used by the player himself/herself for performing the gameplay on a computer device of each player;

make a connection between a game space being used by an executing player for performing the gameplay and another game space to allow a player character of the executing player to be movable to the other game space, the executing player satisfying a given transfer execution condition; and generate a disturbance object for disturbing the gameplay of a disturbance target player in a game space being used by the disturbance target player for performing the gameplay, the disturbance target player being a player other than a source player satisfying a given disturbance element generation condition.

13. The computer system as defined in claim 12, wherein allowing the player character to be movable comprises making the connection between a given position of the game space being used by the executing player for performing the gameplay and a given position of the other game space in a passable manner to allow the player character of the executing player to be movable to the other game space.

14. The computer system as defined in claim 12, wherein allowing the player character to be movable comprises performing a control for releasing the connection when a given termination condition is satisfied.

15. A computer system comprising:

at least one processor or circuit programmed to:

perform a game start control comprising setting a game space for each player as an initial state and allowing the player to start gameplay where the player operates a player character in the game space;

perform a control for displaying information about status of at least one game space other than the game space being used by the player himself/herself for performing the gameplay on a computer device of each player;

perform a transfer control for transferring a player character of an executing player from a game space being used by the executing player for performing the gameplay to another game space, the executing player satisfying a given transfer execution condition; and generate a disturbance object for disturbing the gameplay of a disturbance target player in a game space being used by the disturbance target player for performing the gameplay, the disturbance target player being a player other than a source player satisfying a given disturbance element generation condition.

16. The computer system as defined in claim 15, wherein generating the disturbance object comprises variably controlling a number of disturbance target players and/or a number of disturbance objects to be generated.

17. The computer system as defined in claim 15, wherein the at least one processor or circuit is further programmed to reflect a given additional score based on a disturbance result by the disturbance object to a game score of the source player.

18. A game system comprising:
computer devices of a plurality of players; and
a server system that is the computer system as defined in claim 1,
the computer devices and the server system being configured to communicate with each other.

19. A game system comprising:
computer devices of a plurality of players; and
a server system that is the computer system as defined in claim 8,
the computer devices and the server system being configured to communicate with each other.

20. A game system comprising:
computer devices of a plurality of players; and
a server system that is the computer system as defined in claim 12,
the computer devices and the server system being configured to communicate with each other.

21. A computer device comprising:
at least one processor or circuit programmed to:
perform a game start control comprising setting a game space for a self player operating the computer device as an initial state and allowing the self player to start gameplay where the self player operates a player character in the game space;
perform a control for displaying information about status of at least one game space being used by an opponent player operating another computer device for performing the gameplay;
perform a transfer control for transferring the player character of the self player from the game space being used by the self player for performing the gameplay to another game space, when the self player satisfies a given transfer execution condition; and
perform a progress control of the game space by the transfer control in a state without the player character that is made absent.

22. A computer device comprising:
at least one processor or circuit programmed to:
perform a game start control comprising setting a game space for a self player operating the computer device as an initial state and allowing the self player to start gameplay where the self player operates a player character in the game space;
perform a control for displaying information about status of at least one game space being used by an opponent player operating another computer device for performing the gameplay by operating a player character;
perform a transfer control for transferring the player character of the opponent player to the game space being used by the self player for performing the gameplay, when the self player satisfies a given transfer execution condition; and
generate a disturbance object for disturbing the gameplay of a disturbance target player in a game space being used by the disturbance target player for performing the gameplay, the disturbance target player being a player other than a source player satisfying a given disturbance element generation condition.

23. A computer device comprising:
at least one processor or circuit programmed to:
perform a game start control comprising setting a game space for a self player operating the computer device as an initial state and allowing the self player to start gameplay where the self player operates a player character in the game space;
perform a control for displaying information about status of at least one game space being used by an opponent player operating another computer device for performing the gameplay by operating a player character;
make a connection between the game space being used by the self player for performing the gameplay and another game space to allow the player character of the self player to be movable to the other game space, when the self player satisfies a given transfer execution condition; and
generate a disturbance object for disturbing the gameplay of a disturbance target player in a game space being used by the disturbance target player for performing the gameplay, the disturbance target player being a player other than a source player satisfying a given disturbance element generation condition.

24. A computer device comprising:
at least one processor or circuit programmed to:
perform a game start control comprising setting a game space for a self player operating the computer device as an initial state and allowing the self player to start gameplay where the self player operates a player character in the game space;
perform a control for displaying information about status of at least one game space being used by an opponent player operating another computer device for performing the gameplay by operating a player character;
perform a transfer control for transferring the player character of the opponent player to the game space being used by the self player for performing the gameplay, when the self player satisfies a given transfer execution condition; and
generate a disturbance object for disturbing the gameplay of a disturbance target player in a game space being used by the disturbance target player for performing the gameplay, the disturbance target player being a player other than a source player satisfying a given disturbance element generation condition.

* * * * *